US011606416B2

(12) United States Patent
Berggren et al.

(10) Patent No.: US 11,606,416 B2
(45) Date of Patent: Mar. 14, 2023

(54) NETWORK CONTROLLED MACHINE LEARNING IN USER EQUIPMENT

(71) Applicant: Telefonaktiebolaget LM Ericsson (publ), Stockholm (SE)

(72) Inventors: Viktor Berggren, Sollentuna (SE); Henrik Rydén, Solna (SE); Michael Liljenstam, Sunnyvale, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 21 days.

(21) Appl. No.: 17/218,675

(22) Filed: Mar. 31, 2021

(65) Prior Publication Data

US 2022/0321647 A1    Oct. 6, 2022

(51) Int. Cl.
| | | |
|---|---|---|
| *H04L 41/16* | (2022.01) | |
| *H04L 67/10* | (2022.01) | |
| *G06N 20/00* | (2019.01) | |
| *G06F 21/57* | (2013.01) | |
| *H04W 8/22* | (2009.01) | |

(Continued)

(52) U.S. Cl.
CPC .............. *H04L 67/10* (2013.01); *G06F 21/57* (2013.01); *G06N 20/00* (2019.01); *H04W 8/22* (2013.01); *H04W 24/10* (2013.01); *H04L 41/045* (2022.05); *H04L 41/16* (2013.01)

(58) Field of Classification Search
CPC ..... H04L 41/16; H04L 63/0407; H04L 67/01; H04L 67/10; H04L 67/125; H04W 4/50; H04W 4/70
See application file for complete search history.

(56) References Cited

U.S. PATENT DOCUMENTS

| 10,716,010 B2 | 7/2020 | Cirkic et al. |
| 2019/0042878 A1* | 2/2019 | Sheller ................ G06K 9/6269 |
| 2019/0220703 A1 | 7/2019 | Prakash et al. |

(Continued)

FOREIGN PATENT DOCUMENTS

WO    2020242689 A1    12/2020

OTHER PUBLICATIONS

"New SID: Study on data collection further enhancement", 3GPP TSG RAN Meeting #86, RP-19xxxx, Sitges, Barcelona, Dec. 9-12, 2019, pp. 1-4.

(Continued)

*Primary Examiner* — Kostas J Katsikis
(74) *Attorney, Agent, or Firm* — Murphy, Bilak & Homiller, PLLC

(57) ABSTRACT

Embodiments include methods for managed machine learning (ML) in a communication network, such as by one or more first network functions (NFs) of the communication network. Such methods include determining whether processing of an ML model in the communication network should be distributed to one or more user equipment (UEs) operating in the communication network, based on characteristics of the respective UEs. Such methods also include, based on determining that the processing of the ML model should be distributed to the one or more UEs, establishing trusted execution environments (TEEs) in the respective UEs and distributing the ML model for processing in the respective TEEs. Other embodiments include complementary methods for UEs, as well as UEs and NFs (or communication networks) configured to perform such methods.

39 Claims, 12 Drawing Sheets

(51) Int. Cl.
*H04W 24/10* (2009.01)
*H04L 41/045* (2022.01)

(56) References Cited

U.S. PATENT DOCUMENTS

| | | |
|---|---|---|
| 2019/0319868 A1 | 10/2019 | Svennebring et al. |
| 2020/0027022 A1 | 1/2020 | Jha et al. |
| 2020/0320340 A1* | 10/2020 | Wentz .................. G06K 9/6221 |
| 2022/0086680 A1* | 3/2022 | Kwok .................. H04L 47/2433 |
| 2022/0086681 A1* | 3/2022 | Kwok .................. H04W 80/08 |
| 2022/0114249 A1* | 4/2022 | Grancharov .......... G06F 21/602 |
| 2022/0272786 A1* | 8/2022 | Bansal .................. H04W 76/38 |

OTHER PUBLICATIONS

Grassi, Marco, et al., "Exploitation Of A Modern Smartphone Baseband", Blackhat Briefings, USA, https://i.blackhat.com/us-18/Thu-August-9/us-18-Grassi-Exploitation-of-a-Modern-Smartphone-Baseband-wp.pdf, 2018, pp. 1-17.

Weinmann, Ralf-Philipp, "Baseband Attacks: Remote Exploitation of Memory Corruptions in Cellular Protocol Stacks", WOOT, https://www.usenix.org/system/files/conference/woot12/woot12-final24.pdf, 2012, pp. 1-10.

"3GPP TR 37.817 V0.1.0", 3rd Generation Partnership Project; Technical Specification Group RAN; Evolved Universal Terrestrial Radio Access (E-UTRA) and NR; Study on enhancement for Data Collection for NR and EN-DC (Release 17), Jan. 2021, pp. 1-8.

"Further discussion on high-level AI framework", 3GPP TSG-RAN WG3 #111e; R3-210917; Online, Jan. 25-Feb. 5, 2021, pp. 1-4.

"Discussion on AI/ML Model Transfer in 5GS", 3GPP SA WG1 #88, S1-193039, Reno, USA, Nov. 18-22, 2019, pp. 1-13.

* cited by examiner

Fig. 14A

```
Receiving outputs of the ML model from the respective TEEs, wherein the outputs of the
ML model are related to one or more UE operations in a RAN associated with the
communication network.
```
1475

```
Obtaining, from the respective UEs, the ML model trained in the respective TEEs.
```
1480

```
Combining the trained ML models into an updated ML model.
```
1485

```
Distributing one or more of the following to the respective TEEs:
an updated ML model for processing in the respective TEEs; an indication that the ML
model should be deleted or removed from the respective TEEs; or an indication that the
respective TEEs should be deactivated.
```
1490

*FIG. 14B*

NETWORK CONTROLLED MACHINE LEARNING IN USER EQUIPMENT

TECHNICAL FIELD

The present invention generally relates to wireless communication networks, and more specifically to techniques for secure, network-managed deployment of machine learning (ML) to user equipment (UEs) operating in such networks.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases. NR was initially specified in 3GPP Release 15 (Rel-15) and continues to evolve through subsequent releases, such as Rel-16 and Rel-17.

5G/NR technology shares many similarities with fourth-generation Long-Term Evolution (LTE). For example, NR uses CP-OFDM (Cyclic Prefix Orthogonal Frequency Division Multiplexing) in the downlink (DL) from network to user equipment (UE), and both CP-OFDM and DFT-spread OFDM (DFT-S-OFDM) in the uplink (UL) from UE to network. As another example, NR DL and UL time-domain physical resources are organized into equal-sized 1-ms subframes. A subframe is further divided into multiple slots of equal duration, with each slot including multiple OFDM-based symbols. However, time-frequency resources can be configured much more flexibly for an NR cell than for an LTE cell. For example, rather than a fixed 15-kHz OFDM sub-carrier spacing (SCS) as in LTE, NR SCS can range from 15 to 240 kHz, with even greater SCS considered for future NR releases.

In addition to providing coverage via cells as in LTE, NR networks also provide coverage via "beams." In general, a downlink (DL, i.e., network to UE) "beam" is a coverage area of a network-transmitted reference signal (RS) that may be measured or monitored by a UE. In NR, for example, RS can include any of the following: synchronization signal/PBCH block (SSB), channel state information RS (CSI-RS), tertiary reference signals (or any other sync signal), positioning RS (PRS), demodulation RS (DMRS), phase-tracking reference signals (PTRS), etc. In general, SSB is available to all UEs regardless of the state of their connection with the network, while other RS (e.g., CSI-RS, DM-RS, PTRS) are associated with specific UEs that have a network connection. 5G/NR networks are expected to meet ever-increasing numbers of key performance indicators (KPIs) including latency, reliability, connection density, user experience, etc. with a complicated system design and optimization issues introduced by features including multi-radio access technology (RAT) dual connectivity (MR-DC), beamforming, and network slicing. Traditional human-machine interaction may be too slow, error-prone, and/or expensive to handle these challenges.

Artificial intelligence (AI) provides a powerful tool to help operators reduce the network complexity and improve the user experience, by analyzing the data collected and autonomously looking for patterns that can yield further insights. In general, AI refers to any human-like intelligence exhibited by a computer or other machine. Machine Learning (ML) is a type of AI that learns by itself to perform a specific assigned task with increasingly greater speed, accuracy, etc., such as by reprogramming itself as it digests more data and/or feedback. ML typically involves phases: a training phase, in which algorithms build a computational operation based on some sample input data; and an inference phase, in which the computational operation is used to make predictions or decisions without being explicitly programmed to perform the assigned task.

Currently, 3GPP is considering how to support RAN AI/ML capabilities in future releases including 5G, beyond-5G (B5G), and/or in 6G. One possible approach is the network sharing an AI/ML model with one or more UEs, which then perform some or all of the model calculations. This can be particularly beneficial for models whose input data comes from the UE, such as UE measurements. However, this approach has various drawbacks that need to be addressed to make it suitable for implementation in 5G networks and UEs.

SUMMARY

Embodiments of the present disclosure provide specific improvements to low-latency, non-periodic communication between user equipment (UEs) and a wireless network (e.g., radio access network, RAN), such as by providing, enabling, and/or facilitating solutions to overcome exemplary problems summarized above and described in more detail below.

Embodiments include methods (e.g., procedures) for managed machine learning (ML) in a communication network. These exemplary methods can be performed by one or more network nodes or functions of the communication network (e.g., 5G network).

These exemplary methods can include determining whether processing of a ML model in the communication network should be distributed to one or more user equipment (UEs) operating in the communication network, based on characteristics of the respective UEs. These exemplary methods can also include, based on determining that the processing of the ML model should be distributed to the one or more UEs, establishing trusted execution environments (TEE) in the respective UEs. These exemplary methods can also include distributing the ML model for processing in the respective TEEs.

In some embodiments, these exemplary methods can also include: sending, to the one or more UEs, respective first requests for UE characteristics; and receiving, from the one or more UEs, reports of the respective UE characteristics. In such embodiments, determining whether the processing of the ML model should be distributed can be based on the respective reported UE characteristics. In some of these embodiments, the reported UE characteristics include any of the following:

UE manufacturer;
network subscription;
an identifier that is unique to the UE;
class, category, and/or type associated with the UE;
status of the UE's battery;
vendor and/or model of processing units in a UE computing platform;
processing capacity available in the UE computing platform;
configuration of available processing capacity;
memory available in the UE computing platform; and
one or more first indicia of trust for the UE computing platform.

In some of these embodiments, the first indicia of trust can include any of the following:
- roots of trust from a manufacturer of a processing unit in the UE computing platform;
- one or more types of trusted computing technology used in the UE computing platform; and
- features that are enabled or disabled in the UE computing platform.

In some of these embodiments, these exemplary methods can also include training the ML model based on the respective UE characteristics. In such embodiments, the trained ML model is distributed for processing in the respective TEEs.

In some embodiments, these exemplary methods can also include obtaining, from one or more second network functions (NFs) of the communication network, one or more second indicia of trust for the respective UEs. In such embodiments, determining whether the processing of the ML model should be distributed can be based on the obtained second indicia of trust for the respective UEs. In various embodiments, the second indicia of trust for each particular UE can include one or more of the following:
- an indication of whether data traffic for the particular UE is according to a type associated with the particular UE;
- an indication of whether a movement pattern for the particular UE is according to a type or class associated with the particular UE; and
- an indication of previous network security problems in an area in which the particular UE is located.

In some embodiments, these exemplary methods can also include receiving outputs of the ML model from the respective TEEs. The outputs of the ML model are related to one or more UE operations in a RAN associated with the communication network.

In some embodiments, establishing the respective TEEs and distributing the ML model for processing in the respective TEEs can be based on one or more ML model characteristics being greater than respective predetermined thresholds. In such embodiments, these exemplary methods can also include, when the one or more ML model characteristics are not greater than the respective predetermined thresholds, distributing the ML model to the respective UEs for non-trusted execution.

In some embodiments, establishing TEEs in the respective UEs can include receiving, from ML clients in the respective UEs, respective cryptographic attestations of software and/or computing platform used for the respective TEEs; and establishing respective secure connections with respective TEEs based on verifying that the respective cryptographic attestations are valid. In such case, the ML model is distributed to the respective TEEs via the respective secure connections.

In some of these embodiments, establishing TEEs in the respective UEs can also include sending respective requests to create the TEEs to the ML clients, such that the cryptographic attestations are received in response to the respective requests; and verifying whether the respective cryptographic attestations are valid.

In other of these embodiments, the cryptographic attestations can be received in respective requests from the ML clients for the ML model. In such case, determining whether processing of a ML model in the communication network should be distributed comprises verifying whether the respective cryptographic attestations are valid.

In some embodiments, these exemplary methods can also include subsequently distributing one or more of the following to the respective TEEs:
- an updated ML model for processing in the respective TEEs;
- an indication that the ML model should be deleted or removed from the respective TEEs; or
- an indication that the respective TEEs should be deactivated.

In some of these embodiments, these exemplary methods can also include obtaining, from the respective UEs, the ML model trained in the respective TEEs; and combining the trained ML models into the updated ML model distributed to the respective TEEs.

In some embodiments, for each of the UEs, the processing in the TEE includes one or more of the following processing operations: training the ML model; updating the ML model; performing inference based on the ML model; monitoring inference performance of the ML model; and determining whether the ML models is outdated or invalid.

In some of these embodiments, determining whether processing of a ML model in the communication network should be distributed can include determining, for the respective UEs, which of the processing operations should be distributed based on the respective characteristics of the respective UEs. In such case, the ML model can be distributed to the respective UEs with respective indications of which processing operations should be performed by the respective UEs. Furthermore, in some of these embodiments, these exemplary methods can also include performing the processing operations, for the ML model, that are not identified by the respective indications distributed to the respective UEs.

Other embodiments include additional exemplary methods (e.g., procedures) for managed machine learning (ML) in a communication network. These exemplary methods can be performed by a user equipment (UE).

These exemplary methods can include establishing a TEE in the UE for processing of an ML model. These exemplary methods can also include receiving the ML model from the communication network. These exemplary methods can also include performing one or more processing operations associated with the ML model in the TEE.

In some embodiments, these exemplary methods can also include receiving, from the communication network, a first request for UE characteristics; and sending, to the communication network, a report of the UE characteristics. In some of these embodiments, the reported UE characteristics can include any of those summarized above.

In some embodiments, the received ML model has been trained (e.g., by the communication network) based on the reported UE characteristics.

In some embodiments, the TEE is established when one or more ML model characteristics are greater than respective predetermined thresholds. In some embodiments, when the one or more ML model characteristics are not greater than the respective predetermined thresholds, the ML model is received from the communication network with a request for non-trusted execution and these exemplary methods can also include performing the one or more processing operations associated with the ML model without establishing the TEE.

In some embodiments, these exemplary methods can also include sending one or more outputs of the ML model to the communication network. The one or more outputs are related to UE operations in a RAN associated with the communication network.

In some embodiments, establishing the TEE can include operations by an ML client in the UE, including sending, to the communication network, a cryptographic attestation of software and computing platform used by the UE (i.e., for the TEE); and establishing a secure connection between the TEE and the communication network. The ML mode can be received via the secure connection.

In some of these embodiments, establishing the TEE can also include the ML client receiving, from the communication network, a request to create the TEE. In such case, the cryptographic attestation is sent in response to the request. In other embodiments, the cryptographic attestation can be sent in a request for the ML model.

In various embodiments, the processing operations performed in the TEE can include one or more of the following: training the ML model; updating the ML model; performing inference based on the ML model; monitoring inference performance of the ML model; and determining whether the ML model is outdated or invalid. In some of these embodiments, the ML model can be received with an indication of which processing operations should be performed by the UE.

In some of these embodiments, these exemplary methods can also include subsequently receiving one or more of the following from the communication network:
an updated ML model for processing in the TEE;
an indication that the ML model should be deleted or removed from the TEE; or
an indication that the TEE should be deactivated.

In some of these embodiments, these exemplary methods can also include, after training the ML model, sending the trained ML model to the communication network. The updated ML model can be received in response. The UE can perform the processing operations on the updated ML model in the TEE.

Other embodiments include UEs (e.g., wireless devices) and network nodes or functions (e.g., base stations, eNBs, gNBs, ng-eNBs, NFs, etc., or components thereof) configured to perform operations corresponding to any of the exemplary methods described herein. Other embodiments include non-transitory, computer-readable media storing program instructions that, when executed by processing circuitry, configure such UEs and network nodes or functions to perform operations corresponding to any of the exemplary methods described herein.

These embodiments provide various benefits, advantages, and/or solutions to problems described herein. For example, embodiments can facilitate improvements to network performance by allowing UEs to run sensitive ML models (and/or use sensitive data) that would otherwise be at risk of attack and/or discovery by unauthorized third parties. As another example, instead of sending all input data to the network for ML inference processing, the UE can perform ML inference processing in the TEE based on locally-available input data. This can result in less data and/or signaling over the network, which improves network performance and reduces energy consumption, while maintaining secrecy of the model within the network and secrecy of the input data within the device. As another example, embodiments can facilitate evolution of model properties and introduction of new model types based on innovation from network providers, which can result in improvements to network service performance over time. Similarly, UEs that incorporate TEEs capable of receiving and executing ML models can provide improved user experience.

These and other objects, features, and advantages of embodiments of the present disclosure will become apparent upon reading the following Detailed Description in view of the Drawings briefly described below.

BRIEF DESCRIPTION OF THE DRAWINGS

FIG. 14, which includes FIGS. 14A-B, shows a flow diagram of an exemplary method performed by one or more network functions or nodes of a communication network (e.g., 5G network), according to various exemplary embodiments of the present disclosure.

DETAILED DESCRIPTION

Figure 1:
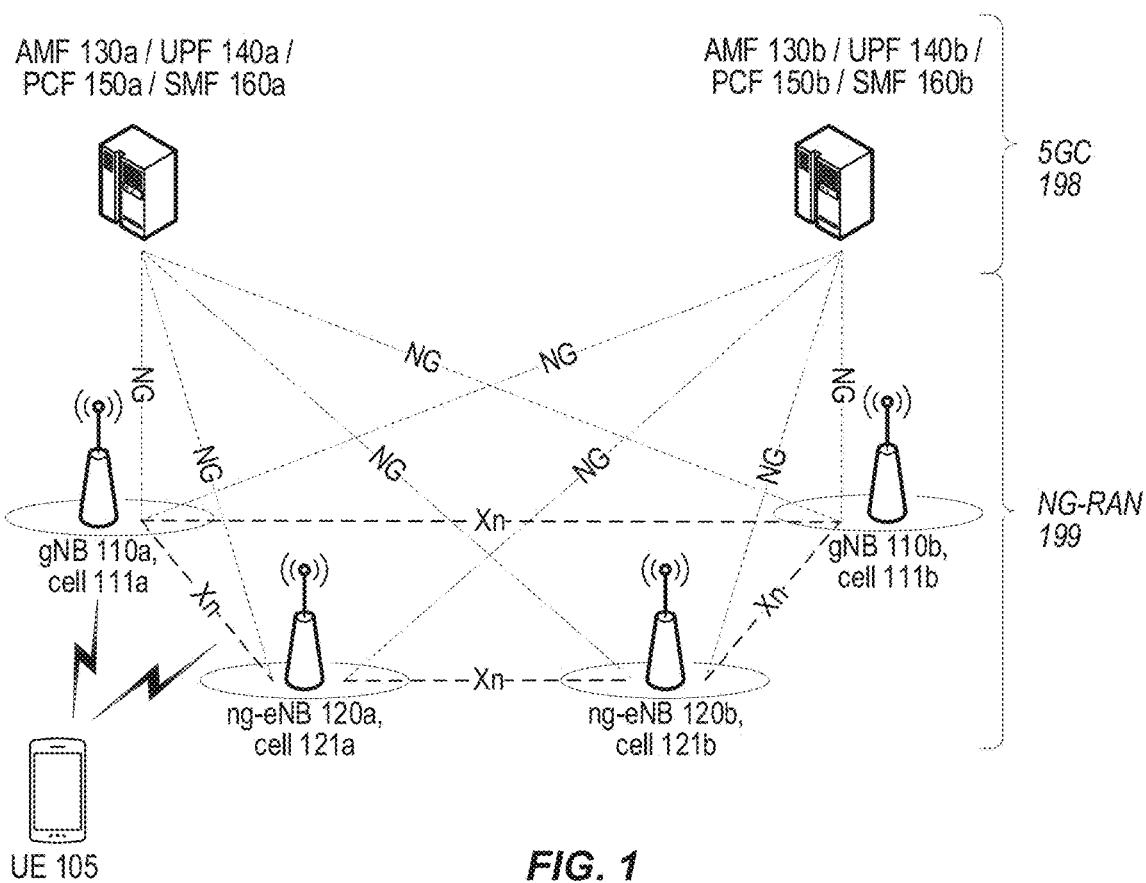
FIGS. 1-2 illustrate various aspects of an exemplary 5G network architecture.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where a step must necessarily follow or precede another step due to some dependency. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a radio access node or a wireless device."

Node: As used herein, a "node" can be a network node or a wireless device.

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

FIG. 1 shows a high-level view of an exemplary 5G network architecture, including a Next Generation Radio Access Network (NG-RAN) 199 and a 5G Core (5GC) 198. As shown in the figure, NG-RAN 199 can include gNBs 110 (e.g., 110*a,b*) and ng-eNBs 120 (e.g., 120*a,b*) that are interconnected with each other via respective Xn interfaces. The gNBs and ng-eNBs are also connected via the NG interfaces to 5GC 198, more specifically to the AMF (Access and Mobility Management Function) 130 (e.g., AMFs 130*a, b*) via respective NG-C interfaces and to the UPF (User Plane Function) 140 (e.g., UPFs 140*a,b*) via respective NG-U interfaces. Moreover, the AMFs 130*a,b* can communicate with one or more policy control functions (PCFs, e.g., PCFs 150*a,b*) and network exposure functions (NEFs, e.g., NEFs 160*a,b*).

Each of the gNBs 110 can support the NR radio interface including frequency division duplexing (FDD), time division duplexing (TDD), or a combination thereof. In contrast, each of ng-eNBs 120 can support the LTE radio interface but, unlike conventional LTE eNodeBs (eNBs), connect to the 5GC via the NG interface. Each of the gNBs and ng-eNBs can serve a geographic coverage area including one more cells, including cells 111*a-b* and 121*a-b* shown as exemplary in FIG. 1. The gNBs and ng-eNBs can also use various directional beams to provide coverage in the respective cells. Depending on the particular cell in which it is located, a UE 105 can communicate with the gNB or ng-eNB serving that cell via the NR or LTE radio interface, respectively.

The gNBs shown in FIG. 1 can include a central (or centralized) unit (CU or gNB-CU) and one or more distributed (or decentralized) units (DU or gNB-DU), which can be viewed as logical nodes. CUs host higher-layer protocols and perform various gNB functions such controlling the operation of DUs, which host lower-layer protocols and can include various subsets of the gNB functions. As such, each of the CUs and DUs can include various circuitry needed to perform their respective functions, including processing circuitry, communication interface circuitry (e.g., for communication via Xn, NG, radio, etc. interfaces), and power supply circuitry. Moreover, the terms "central unit" and "centralized unit" can be used interchangeably, as can the terms "distributed unit" and "decentralized unit."

A CU connects to its associated DUs over respective F1 logical interfaces. A CU and associated DUs are only visible to other gNBs and the 5GC as a gNB, e.g., the F1 interface is not visible beyond a CU. A CU can host higher-layer protocols such as F1 application part protocol (F1-AP), Stream Control Transmission Protocol (SCTP), GPRS Tunneling Protocol (GTP), Packet Data Convergence Protocol (PDCP), User Datagram Protocol (UDP), Internet Protocol (IP), and Radio Resource Control (RRC) protocol. In contrast, a DU can host lower-layer protocols such as Radio Link Control (RLC), Medium Access Control (MAC), and physical-layer (PHY) protocols.

Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU.

In 5G networks (e.g., in 5GC), traditional peer-to-peer interfaces and protocols found in earlier-generation networks are modified and/or replaced by a Service Based Architecture (SBA) in which Network Functions (NFs) provide one or more services to one or more service consumers. This can be done, for example, by Hyper Text Transfer Protocol/Representational State Transfer (HTTP/REST) application programming interfaces (APIs). In general, the various services are self-contained functionalities that can be changed and modified in an isolated manner without affecting other services. This SBA model also adopts principles like modularity, reusability, and self-containment of NFs, which can enable deployments to take advantage of the latest virtualization and software technologies.

The services in 5GC can be stateless, such that the business logic and data context are separated. For example, the services can store their context externally in a proprietary database. This can facilitate various cloud infrastructure features like auto-scaling or auto-healing. Furthermore, 5GC services can be composed of various "service operations", which are more granular divisions of overall service functionality. The interactions between service consumers and producers can be of the type "request/response" or "subscribe/notify".

Figure 2:
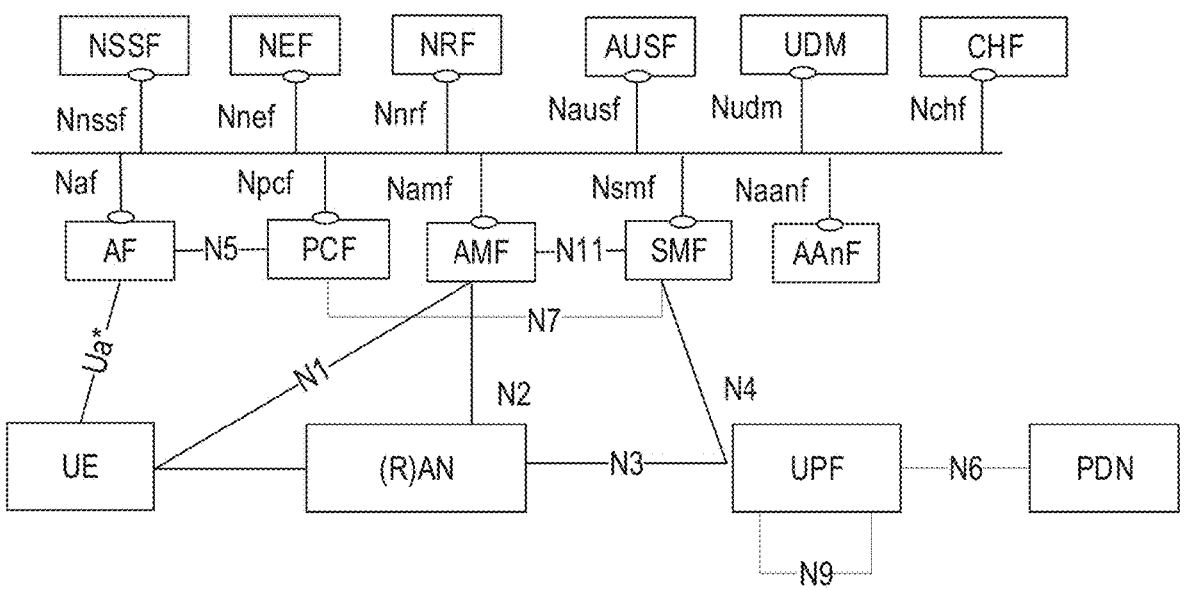

FIG. 2 shows an exemplary non-roaming 5G reference architecture with service-based interfaces and various 3GPP-defined NFs within the Control Plane (CP). These include the following NFs, with additional details provided for those most relevant to the present disclosure:

Application Function (AF, with Naf interface) interacts with the 5GC to provision information to the network operator and to subscribe to certain events happening in operator's network. An AF offers applications for which service is delivered in a different layer (i.e., transport layer) than the one in which the service has been requested (i.e., signaling layer), the control of flow resources according to what has been negotiated with the network. An AF communicates dynamic session information to PCF (via N5 interface), including description of media to be delivered by transport layer.

Policy Control Function (PCF, with Npcf interface) supports unified policy framework to govern the network behavior, via providing PCC rules (e.g., on the treatment of each service data flow that is under PCC control) to the SMF via the N7 reference point. PCF provides policy control decisions and flow based charging control, including service data flow detection, gating, QoS, and flow-based charging (except credit management) towards the SMF. The PCF receives session and media related information from the AF and informs the AF of traffic (or user) plane events.

User Plane Function (UPF)—supports handling of user plane traffic based on the rules received from SMF, including packet inspection and different enforcement actions (e.g., event detection and reporting). UPFs communicate with the RAN (e.g., NG-RNA) via the N3 reference point, with SMFs (discussed below) via the N4 reference point, and with an external packet data network (PDN) via the N6 reference point. The N9 reference point is for communication between two UPFs.

Session Management Function (SMF, with Nsmf interface) interacts with the decoupled traffic (or user) plane, including creating, updating, and removing Protocol Data Unit (PDU) sessions and managing session context with the User Plane Function (UPF), e.g., for event reporting. For example, SMF performs data flow detection (based on filter definitions included in PCC rules), online and offline charging interactions, and policy enforcement.

Charging Function (CHF, with Nchf interface) is responsible for converged online charging and offline charging functionalities. It provides quota management (for online charging), re-authorization triggers, rating conditions, etc. and is notified about usage reports from the SMF. Quota management involves granting a specific number of units (e.g., bytes, seconds) for a service. CHF also interacts with billing systems.

Access and Mobility Management Function (AMF, with Namf interface) terminates the RAN CP interface and handles all mobility and connection management of UEs (similar to MME in EPC). AMFs communicate with UEs via the N1 reference point and with the RAN (e.g., NG-RAN) via the N2 reference point.

Network Exposure Function (NEF) with Nnef interface—acts as the entry point into operator's network, by securely exposing to AFs the network capabilities and events provided by 3GPP NFs and by providing ways for the AF to securely provide information to 3GPP network. For example, NEF provides a service that allows an AF to provision specific subscription data (e.g., expected UE behavior) for various UEs.

Network Repository Function (NRF) with Nnrf interface—provides service registration and discovery, enabling NFs to identify appropriate services available from other NFs.

Network Slice Selection Function (NSSF) with Nnssf interface—a "network slice" is a logical partition of a 5G network that provides specific network capabilities and characteristics, e.g., in support of a particular service. A network slice instance is a set of NF instances and the required network resources (e.g., compute, storage, communication) that provide the capabilities and characteristics of the network slice. The NSSF enables other NFs (e.g., AMF) to identify a network slice instance that is appropriate for a UE's desired service.

Authentication Server Function (AUSF) with Nausf interface—based in a user's home network (HPLMN), it performs user authentication and computes security key materials for various purposes.

Location Management Function (LMF) with Nlmf interface—supports various functions related to determination of UE locations, including location determination for a UE and obtaining any of the following: DL location measurements or a location estimate from the UE; UL location measurements from the NG RAN; and non-UE associated assistance data from the NG RAN.

The Unified Data Management (UDM) function supports generation of 3GPP authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

Communication links between the UE and a 5G network (AN and CN) can be grouped in two different strata. The UE communicates with the CN over the Non-Access Stratum (NAS), and with the AN over the Access Stratum (AS). All the NAS communication takes place between the UE and the AMF via the NAS protocol (N1 interface in FIG. 2). Security for the communications over this these strata is provided by the NAS protocol (for NAS) and the PDCP protocol (for AS).

PHY, MAC, RLC, and PDCP layers between the UE and the gNB are common to both the user plane (UP) and the control plane (CP). PDCP provides ciphering/deciphering, integrity protection, sequence numbering, reordering, and duplicate detection for CP and UP. In addition, PDCP provides header compression and retransmission for UP data.

On the UP side, Internet protocol (IP) packets arrive to the PDCP layer as service data units (SDUs), and PDCP creates protocol data units (PDUs) to deliver to RLC. In addition, the Service Data Adaptation Protocol (SDAP) layer handles quality-of-service (QoS) including mapping between QoS flows and Data Radio Bearers (DRBs) and marking QoS flow identifiers (QFI) in UL and DL packets.

When each IP packet arrives, PDCP starts a discard timer. When this timer expires, PDCP discards the associated SDU and the corresponding PDU. If the PDU was delivered to RLC, PDCP also indicates the discard to RLC. The RLC layer transfers PDCP PDUs to the MAC through logical channels (LCH). RLC provides error detection/correction, concatenation, segmentation/reassembly, sequence numbering, reordering of data transferred to/from the upper layers. If RLC receives a discard indication from associated with a PDCP PDU, it will discard the corresponding RLC SDU (or any segment thereof) if it has not been sent to lower layers.

The MAC layer provides mapping between LCHs and PHY transport channels, LCH prioritization, multiplexing into or demultiplexing from transport blocks (TBs), hybrid ARQ (HARQ) error correction, and dynamic scheduling (on gNB side). The PHY layer provides transport channel services to the MAC layer and handles transfer over the NR radio interface, e.g., via modulation, coding, antenna mapping, and beam forming.

Figure 3:
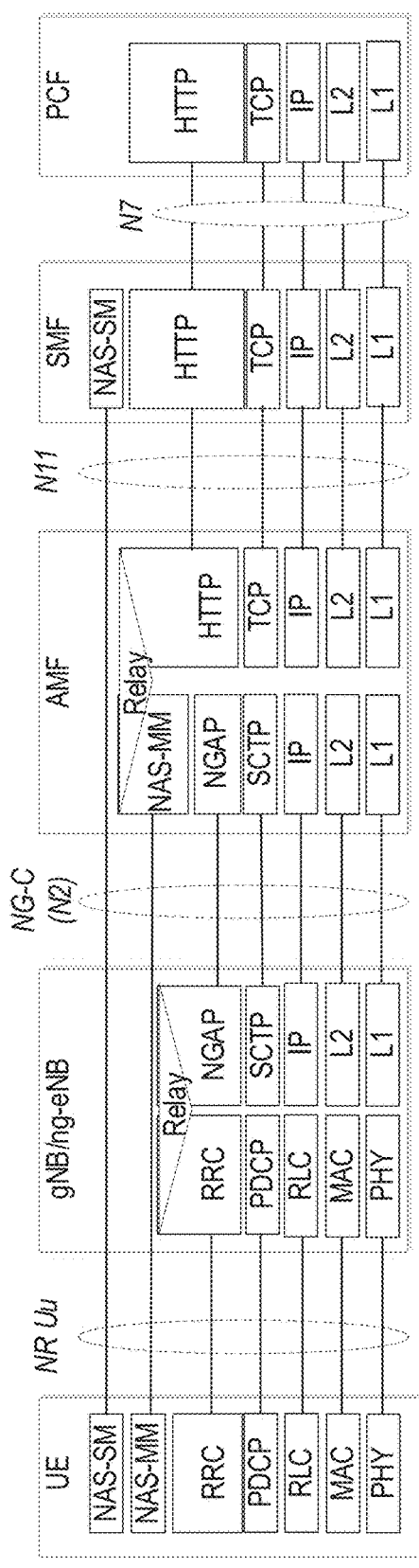
FIG. 3 shows an exemplary arrangement of control plane (CP) protocols in a 5G network.

FIG. 3 shows an exemplary arrangement of CP protocols between a UE, a gNB (or ng-eNB), an AMF, an SMF, and a PCF in a 5G network. FIG. 3 also shows various interfaces and reference points discussed above in relation to FIGS. 1-2. The protocols used on the N11 (between SMF and AMF) and N7 (between SMF and PCF) include HTTP/TCP/IP on top of implementation-specific L1/L2 protocols.

The NAS layer is between UE and AMF and handles UE/gNB authentication, mobility management, and security control. The NAS Session Management (NAS-SM) protocol is terminated by the UE and the SMF, while the NAS Mobility Management (NAS-MM) protocol is terminated by the UE and the AMF. These NAS protocols are carried via RRC over the Uu interface between UE and gNB, then via various other protocols over the NG-C interface between gNB and AMF.

RRC also broadcasts system information (SI) and establishes, configures, maintains, and releases DRBs and Signaling Radio Bearers (SRBs) used by UEs. Additionally, RRC controls addition, modification, and release of carrier aggregation (CA) and dual-connectivity (DC) configurations for UEs. RRC also performs various security functions such as key management.

After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "DRX On durations"), an RRC_IDLE UE receives SI broadcast in the cell where the UE is camping, performs measurements of neighbor cells to support cell reselection, and monitors a paging channel on physical DL control channel (PDCCH) for pages from 5GC via gNB. A UE in RRC_IDLE state is not known to the gNB serving the cell where the UE is camping. However, NR RRC includes an RRC_INACTIVE state in which a UE is known (e.g., via context) by the serving gNB.

In NR, UL and DL data transmissions take place on physical UL shared channel (PUSCH) and physical DL shared channel (PDSCH), respectively. These data transmissions can occur with or without an explicit grant or assignment of resources by the network (e.g., gNB). UL transmissions are usually referred to as being "granted" by the network (i.e., "UL grant"), while DL transmissions are usually referred to as being "assigned" (i.e., "DL assignment").

Figure 4:
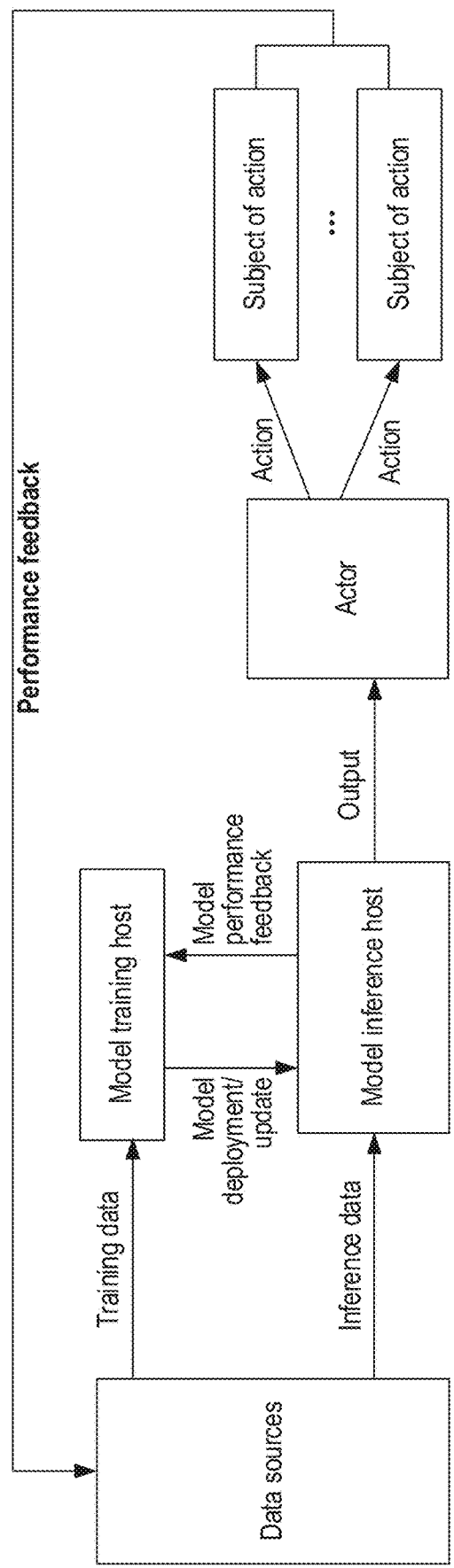
FIG. 4 shows a high-level artificial intelligence (AI) framework that illustrates various components and interactions.

Artificial intelligence (AI) and Machine Learning (ML) provide powerful tools to help operators reduce the network complexity and improve the user experience, by analyzing the data collected and autonomously looking for patterns that can yield further insights. FIG. 4 shows a high-level AI framework that illustrates various components and interactions. The components shown in FIG. 4 include one or more data sources, model hosts, an actor, and one or more subjects of actions.

The one or more data sources provide training data to a model training host, which trains the model based on the training data and then deploys the trained model to the model interference host. The one or more data sources also provide inference data to the model inference host, which applies the trained model to the inference data to generate one or more outputs. Generally, different data is used for training (e.g., a "training dataset") and inference.

Additionally, the model inference host can provide model performance feedback to the model training host, which can adjust (e.g., retrain) the model accordingly. The output is received by an actor, which uses it to generate actions towards respective subjects. Performance feedback from these actions can be integrated and/or captured into the data sources, which can be used for subsequent model training and/or inference.

The model training host can be the same or a different entity than the model inference host. Additionally, although shown as separate, the actor and subject and be the same entity. More generally, the various components and interactions shown in FIG. 4 can be combined and/or subdivided as needed according to any specific implementation.

As briefly mentioned above, 3GPP is considering how to support AI/ML capabilities in future releases including 5G, beyond-5G (B5G), and/or in 6G. One possible approach is the network sharing an AI/ML model with one or more UEs, which then perform some or all of the model calculations. This can be particularly beneficial for models whose input data comes from the UE, such as UE measurements. One benefit is reduced data transmission and/or signaling, since the UE does not have to provide the input data to the network. This also can result in improved subscriber privacy, which can be important if the input data is sensitive (e.g., subscriber location). Another benefit is reduced processing in the network. Another benefit is that the model can be executed more frequently at the UE, e.g., whenever new input data is available.

One exemplary scenario in which ML can be useful for UE operations in a RAN (e.g., NG-RAN discussed above) is secondary carrier prediction. Conventionally, a UE provides measurements to enable a serving RAN node to determine whether to handover the UE to second RAN node operating at a higher frequency. This can include inter-frequency measurements by the UE, which can increase UE energy consumption. When ML-based techniques are used by the network, however, a UE only needs to provide source carrier information, from which the network can predict a target carrier frequency for the UE. As such, the UE does not need to perform inter-frequency measurements, leading to energy savings at the UE.

In general, the target carrier prediction performance depends on accuracy of estimating a UE's, which is typically done in the network based on measuring UE transmissions at various spatially-separate nodes or transmission reception points (TRPs). This process can be referred to as "radiolocation". Even better accuracy can be obtained by combining network-based radiolocation and UE-based location estimates. For example, global navigation satellite system (GNSS) receivers in UEs have typical location accuracy ~10 m, while accuracy of radiolocation is related to inter-site distance (typically hundreds of meters).

Frequent signaling of source carrier information that facilitates network-based ML prediction of target carrier can also cause undesirable overhead in the network. On the other hand, the risk of not performing frequent periodic signaling is a missed opportunity for inter-frequency handover of UEs to less-loaded cells on other carrier(s).

Figure 5:
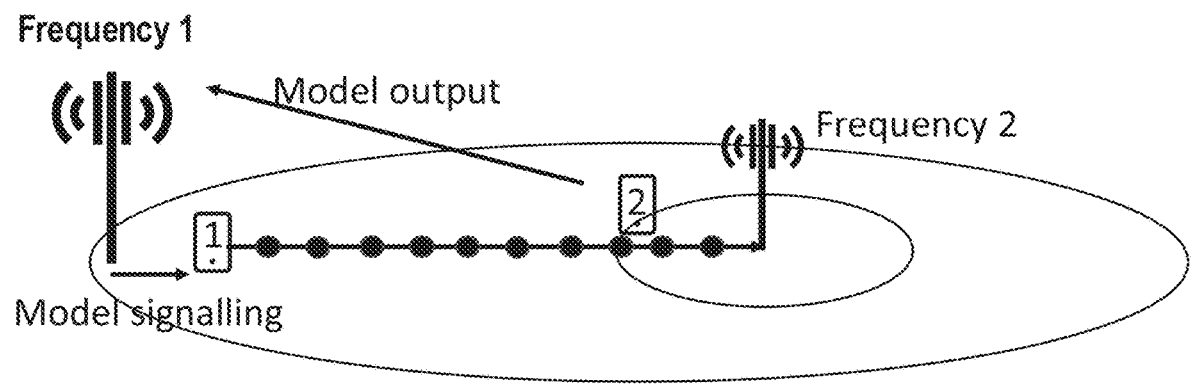
FIG. 5 shows an exemplary scenario in which a machine learning (ML) model is sent to a UE, which uses it to perform secondary carrier prediction according to various exemplary embodiments of the present disclosure.

One way to address this is to provide the ML model to the UE. FIG. 5 shows an exemplary scenario in which an ML model is sent to a UE, which uses it to perform secondary carrier prediction. In particular, the UE receives the model from a first RAN node operating on frequency 1 ("source carrier") and then uses source carrier measurements and its own location as model inputs to predict coverage on frequency 2 ("target carrier"). In the scenario shown in FIG. 5, the UE provides a report to the first RAN node when the ML model output indicates coverage by the target carrier. However, the UE determines this coverage without explicit measurements of the target carrier, which reduces UE energy consumption as discussed above.

However, this approach has various drawbacks that need to be addressed to make it suitable for implementation in 5G networks and UEs. For example, there are security risks associated with having a model at the UE. In the scenario shown in FIG. 5, the UE uses its estimated location to estimate the coverage on a certain carrier based on an ML model. A malicious UE input all potential locations to the ML model to obtain signal quality and/or coverage for an entire region.

Figure 6:
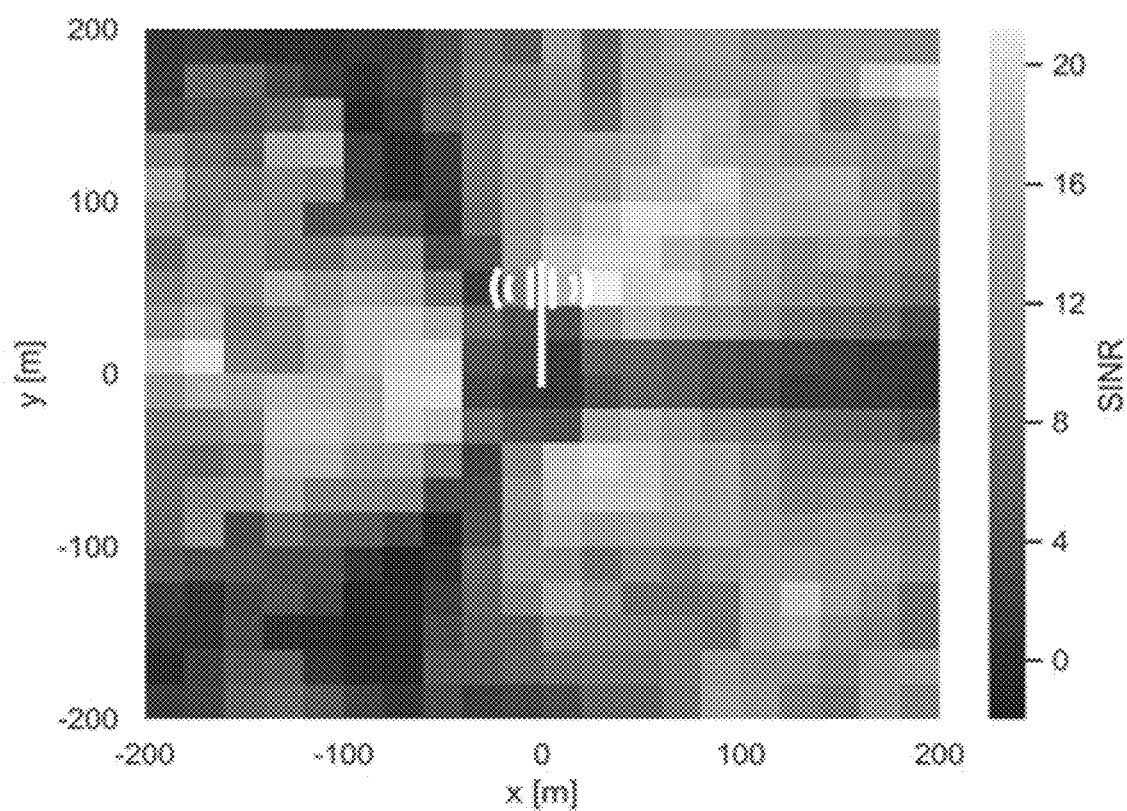
FIG. 6 shows an example of malicious behavior by a UE using an ML model.

FIG. 6 shows an example of this malicious behavior, in which a UE has generated the radio coverage map of a certain area. Based on this information, the malicious UE could find the coverage holes in order to find locations of where to put up false base stations and/or jammers. Additionally, the malicious UE could use the radio coverage map to estimate the locations of each operator base station, with the intent of placing jammers nearby these locations to disrupt network service.

Other ML model use cases can be attacked when the UE understands the provided model. One example is ML models that detect aerial UE ("drone") behavior based on radio measurements or geolocation patterns. By knowing the provided ML model, an unlicensed drone can provide false model input and/or false model output to the network, thereby avoiding detection.

As mentioned above, providing the ML model to the UE avoids sending sensitive and/or confidential user information that is local to the UE over the radio interface. In some scenarios, an ML model may use sensitive and/or confidential user information that is not generally available outside of certain NFs. In such case, this data will need to be provided to the UE along with the ML model. This increases the traffic over the radio interface and, more importantly, risks exposure of the sensitive data to other NFs and any parties listening to the radio interface.

3GPP does not currently specify any requirements and/or techniques for providing ML models to UEs. In general, specifying properties of models to signal between network and UE will expose model properties to device. Also, if model properties need to be set in standards it will slow down innovation as future more efficient and sophisticated models require new specifications to be approved. Conventional solutions are generally based on an open architecture without any consideration for the security issues discussed above.

Typical UEs include a modem/baseband unit (also referred to as "baseband processor" or BP) that handles radio communication protocols and an application processor (AP) that runs application-related tasks including the user interface (UI). The BP and AP are physically separated and run separate software stacks but can communicate with each other via an interface (e.g., shared memory). The separation is due to various reasons: 1) the BP runs a separate real-time operating system (OS) with very strict timing requirements; 2) to make the communication protocols secure from threats; and 3) to facilitate certification of a single modem part independent of AP, which may differ among devices. The attack surface and potential threats will differ depending on whether an ML model would reside in BP or AP, and how it would be used. In the AP, it is primarily up to the higher-level OS (e.g., iOS, Android) to maintain isolation properties and protect data and applications. The BP is generally considered more secure, as it is a more constrained software environment. Nevertheless, attacks against the radio communication protocol stack in the BP have been demonstrated and the complexity of that BP stack keeps increasing, as new generations of RATs and more features are added. This complexity leads to increased vulnerabilities, threats, and/or attack surface.

Accordingly, embodiments of the present disclosure address these and other problems, issues, and/or difficulties by providing techniques that facilitate network-controlled provisioning of an ML model to trusted execution environments (TEEs) within UEs, and subsequent execution of ML tasks associated with the provisioned model within the TEEs. These techniques can involve the following tasks and/or aspects, which can be considered part of "life cycle management" (LCM) of the ML model:

- exposing UE TEE capabilities to the network without exposing them to third parties;
- allowing the network to confirm or verify an attestation quote from a TEE; and/or
- allowing the network to provision, manage, and/or train ML models within the TEEs based on the received TEE capabilities, without exposing the ML models to third parties.

The ability for the network to securely manage training of ML models in the UE can facilitate distributed ML, such as by implementing the secondary carrier prediction operations discussed above with federated learning. A model trained to output network service control data can either be executed locally on the UE or be sent to the network for service control, with minimal data being transferred over radio interface. For the secondary carrier prediction use case, the ML model hosted by the TEE can predict whether/when to switch to an alternative (second) carrier.

These techniques provide various benefits, advantages, and/or solutions to problems described herein. For example, such techniques can facilitate improvements to network performance by allowing UEs to run sensitive ML models (and/or use sensitive data) that would otherwise be at risk of attack and/or discovery by unauthorized third parties. As another example, instead of sending all input data to the network for ML inference processing, the UE will perform ML inference processing in the TEE based on locally-available input data. This can result in less data and/or signaling over the network, which improves network performance and reduces energy consumption, while maintaining secrecy of the model within the network and secrecy of the input data within the device. As yet another example, these techniques facilitate evolution of model properties and introduction of new model types based on innovation from network providers, which can result in improvements to network service performance over time. Similarly, UEs that incorporate TEEs capable of receiving and executing ML models can provide improved user experience.

Trusted computing can provide technical solutions to improve security of Internet services running on remote (e.g., cloud) computing infrastructure. With trusted computing, a computer will consistently behave in ways expected by the user. Moreover, those behaviors will be enforced by hardware and software, such as by loading the hardware with a unique encryption key inaccessible to the rest of the computing infrastructure. Trusted computing can also protect user information from owners of cloud computing infrastructure. For example, it can be advantageous that an infrastructure owner has no "super-powers" to observe, measure, etc. the user processes that are executing on the constituent computing machines.

Attestation is an important concept of trusted computing. A process can attest to one or more facts about itself, e.g., that it executes on a particular type of processor (e.g., CPU, GPU, TPU, etc.), a specific software image is being executed, etc. An attestation can be sent to a remote party that wants to ensure that specific software is running on trusted computing hardware. In general, attestation depends on a trust chain, such as the user trusting a CPU manufacturer, who trusts that a key loaded into a particular CPU is valid and that the CPU signs an attestation using that key.

Figure 7:
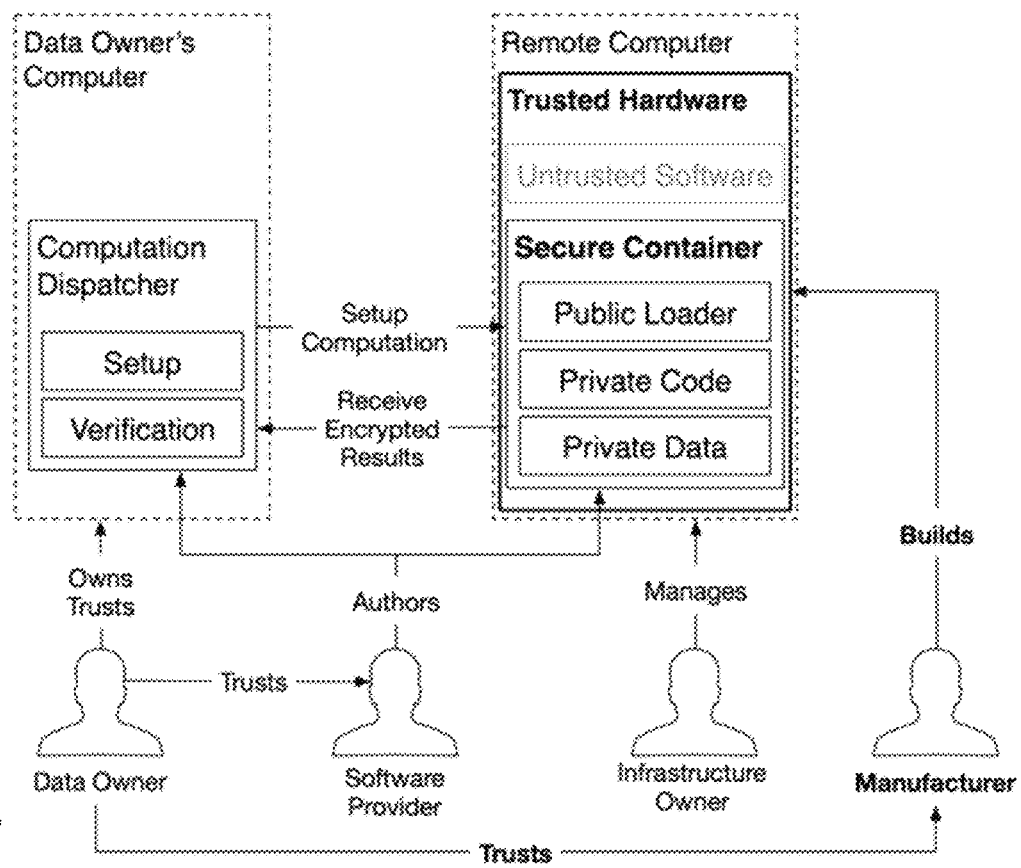
FIG. 7 shows a high-level arrangement for using trusted computing to support secure workload execution on trusted hardware.

FIG. 7 shows a high-level arrangement for using trusted computing to support secure workload execution on trusted hardware. The arrangement illustrates four different roles: data owner, software provider, infrastructure (i.e., machine or data center) owner, and hardware (e.g., CPU) manufacturer. The data owner establishes trust with the manufacturer and the software provider. The manufacturer provides the trusted hardware, which establishes a secure container into which the data owner (or service user) uploads the desired computation and data. The trusted hardware protects the data's confidentiality and integrity while the computation is being performed.

Figure 8:
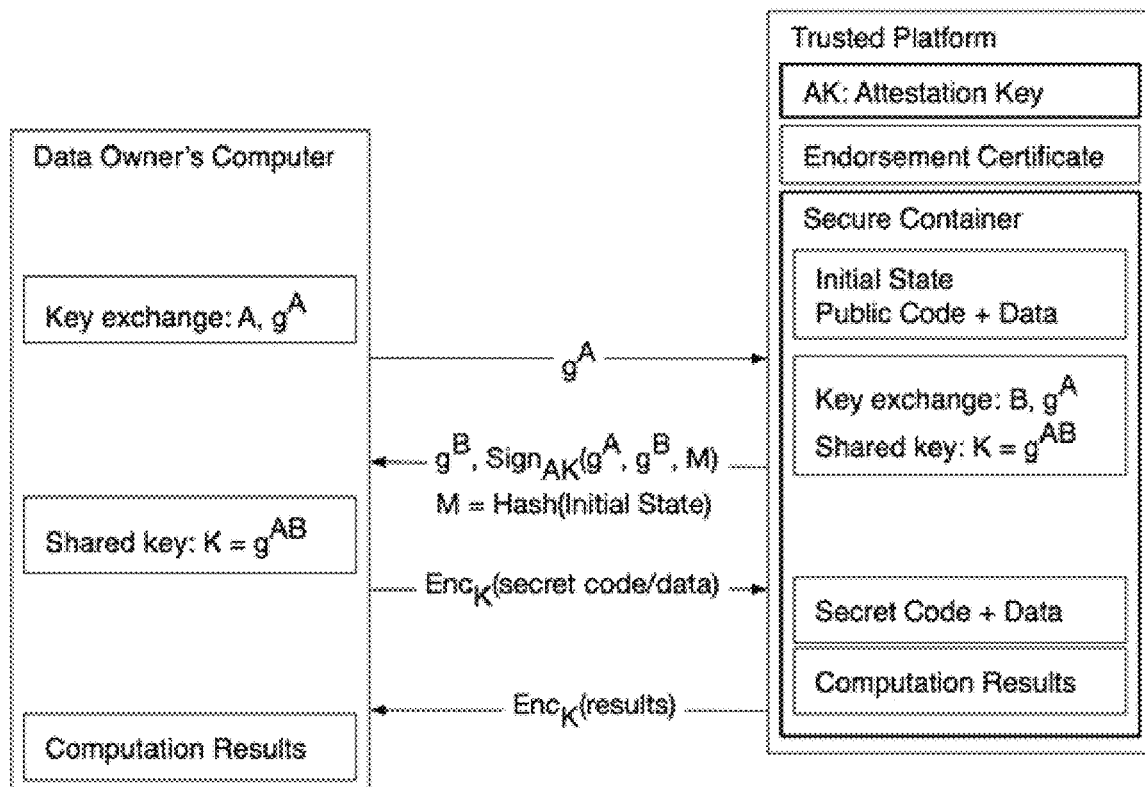
FIG. 8 illustrates an exemplary process of software attestation, which can be performed in the context of the arrangement shown in FIG. 7.

FIG. 8 illustrates an exemplary process of software attestation, which can be performed in the context of the arrangement shown in FIG. 7. The attestation proof is a cryptographic signature that certifies the hash of the contents of a secure container on the remote computer. In other words, the remote computer's owner can load any software in a secure container, but the remote computation service user will refuse to load data into a secure container whose contents' hash does not match the expected value. The remote computation service user verifies the attestation key used to produce the signature using services or keys issued (in an endorsement certificate) by the trusted hardware's manufacturer. The certificate states that the attestation key is only known to the trusted hardware, and only used for the purpose of attestation.

In the process shown in FIG. 8, the trusted platform (i.e., CPU of the remote computer) takes a hash of its initial state (e.g., software and configuration). It then uses the Attestation Key (AK) to sign this state. The manufacturer embeds the AK in the hardware which protects the AK from unauthorized access and allows the manufacturer to trust the AK. With a signature from the remote computer and another signature by its manufacturer, the data owner knows that, barring vulnerabilities in the CPU, the computations performed by the computer are safe from everyone, including any spying by the owner of the remote computer.

The data owner's Computer and the remote computer also establish a secure communications channel protected by key K. In FIG. 8, this is performed via a Diffie-Hellman key exchange, but other methods are also possible. A secure channel is necessary because otherwise any assurance by the remote computer about data privacy or faithful execution of the task would be worthless, since attackers could spy or change the data or results communicated between the data owner's computer and the remote computer.

Although FIGS. 7-8 illustrate attestation in the context of remote computing, similar techniques can be used in the context of networking equipment. For example, the networking platform identity can be based on IEEE 802.1AR Device Identity. Some applications with a more-complex post-manufacture supply chain (e.g., value-added resellers) or with specific privacy concerns may use an alternate mechanism for platform authentication. Attestation of mutable elements throughout the life of fielded devices can be implemented, to provide an authenticated mechanism to report what software actually starts up on the device each time it reboots. Additionally, Reference Integrity Measurements must be conveyed from the software authority (often the manufacturer for embedded systems) to the system in which verification will take place.

Trusted Execution Environment (TEE) refers to a "secure compartment" in a computing platform (e.g., CPU, GPU, etc.) where confidential and/or sensitive code and data can be stored and remain isolated from other processes. In general, a TEE offers enhanced confidentiality and integrity protection relative to a non-TEE. Typical use cases include storing and performing operations on security key material or other sensitive data. Examples of TEE technologies include Intel SGX, ARM TrustZone, and AMD Secure Encrypted Virtualization (SEV).

Intel's Software Guard eXtensions (SGX) is designed for implementing secure remote computation, secure web browsing, and digital rights management (DRM). Other applications include concealment of proprietary algorithms and of encryption keys. SGX is a set of security-related instruction codes that are built into some modern Intel central processing units (CPUs). They allow both user-level code and OS code to define private regions of memory ("enclaves") whose contents are protected and unable to be either read or saved by any process outside the enclave itself, including processes running at higher privilege levels. SGX is disabled by default and must be enabled by a user via CPU motherboard settings on a supported system.

SGX involves CPU encryption of a portion of memory constituting an enclave. The enclave is decrypted on the fly only within the CPU itself, and only for code and data running from within the enclave itself. The CPU thus protects the enclave code and data from being "spied on" or examined by other code outside the enclave. The code and data in the enclave utilize a threat model in which the enclave is trusted but no process outside it can be trusted (including the OS and any hypervisor), and therefore all of these are treated as potentially hostile. The enclave contents are unable to be read by any code outside the enclave, other than in its encrypted form. Applications running inside of SGX must be written to be side channel resistant, since SGX does not protect against side channel measurement or observation.

Similarly, ARM TrustZone creates a single separate "secure world" that is isolated from the "normal world" processes. Intel SGX is currently only available for laptop/desktop- and server segment CPUs, while ARM TrustZone is available in mobile device application processors and currently used as one part of solutions such as Samsung Knox.

AMD Secure Encrypted Virtualization (SEV) can be used for running whole Virtual Machines (VMs) in trusted execution environments. SEV can be used in conjunction with a compute service such as OpenStack Nova, which in that case maintains information about trusted computing-related capabilities of SEV-enabled compute nodes (i.e., VM hosts) registered to it. Users can specify that certain VM instances need to be launched on such nodes.

Some of these TEE technologies provide "remote attestation" mechanisms such as described above in relation to FIG. 8. In the case of Intel SGX, a combination of HW and SW functions can provide cryptographically signed evidence (a "quote") that it is genuine Intel SGX-capable hardware with certain "platform properties" (e.g., secure microcode, BIOS versions, etc.) and a hash of the code and data loaded into the TEE as it was created. Thus, the remote user can verify that the TEE hardware can be trusted, and the intended software (and any necessary configuration data) is loaded into the TEE before entrusting it with any secrets. ARM TrustZone does not provide the same built-in mechanisms. But some solutions, such as Samsung Knox, leverage ARM TrustZone as a building block for remote attestation of the AP and associated software stack for device management.

These trusted computing parameters provided during attestation are also referred to herein as "indicia of trust". In addition to the specific parameters discussed above, this term refers more generally to any trusted computing parameters required for the network to trust a computing platform (e.g., UE) for provisioning of an ML model and subsequent processing using the ML model. As another example, rather than a hash of the code and data, an indicia of trust for the software can be a pointer (e.g., URL/URI) to a trusted third party who certify (e.g., sign a statement) that a given software image and configuration data is an acceptable for the desired function. For instance, commercial entities (e.g., Ericsson), OS vendors (e.g., Apple), non-governmental entities (e.g., Internet Society or the EFF), and governments might audit and review software to ensure that the software does what it is advertised to do and does not leak user information, for example.

Additionally, trusted computing parameters can be represented by roots of trust (e.g., from CPU manufacturers) and technology parameters such as type of trusted computing technology is in use, specific features that must be enabled or disabled for the user to trust secure operation of the service, etc. For example, the network may trust a specific AMD trusted computing technology but not trust a specific Intel trusted computing technology. As another example, features such as hyperthreading may not be sufficiently reliable for use in security sensitive tasks due to discoveries of CPU vulnerabilities. By receiving the indicia of trust from the UE indicating the type of computing technology and whether hyperthreading is enabled/disabled in the UE's TEE, the network can determine whether the TEE can be trusted for provisioning and processing of the ML model.

Even more generally, the indicia of trust can be just one of many possible characteristics of the UE on which the network can base the decision of whether to provision and/or distribute the ML model to a TEE in the UE. These characteristics can include, but are not limited to, any of the following:

UE manufacturer;
network subscription (e.g., operator);
an identifier that is unique to the UE (e.g., IMEI);
class (e.g., eMBB, smartphone, IoT, REDCAP, URLLC, XR, etc.), category (e.g., NR performance capability), and/or type associated with the UE;
status of the UE's battery;
vendor and/or model of processing units (e.g., CPU, GPU, etc.) in a UE computing platform;
processing capacity available in the UE computing platform;
configuration of available processing capacity (e.g., BP, AP, or combination);
memory available in the UE computing platform; and
indicia of trust for the UE computing platform.

For example, radio related predictions often can be performed faster by the BP than by the AP. By obtaining the configuration of the available processing capacity, the network can decide whether it fits the execution time and memory constraints of the ML model to be provisioned. Alternately, the network can tailor the ML model to the available processing capacity, and/or the particular processing operations to be performed after the ML model is provisioned.

Figure 9:
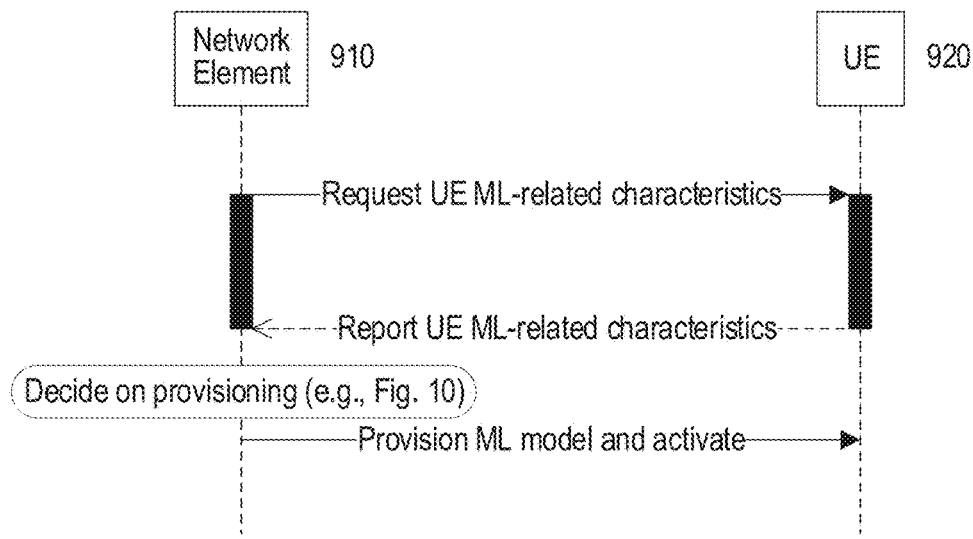
FIG. 9 shows a signal flow diagram between a UE and a network element, according to various exemplary embodiments of the present disclosure.

FIG. 9 shows a signal flow diagram between a UE (920) and a network element (910), according to various exemplary embodiments of the present disclosure. In FIG. 9, the "network element" can be any node or function in, or associated with, a wireless network that is responsible for provisioning of an ML model to TEEs in UEs served by the wireless network. For example, the network element can be a RAN node (e.g., eNB, gNB, etc.), a core network node or function (e.g., NF in 5GC), an application function (AF), etc.

Initially, the network element requests ML-related characteristics from the UE, and the UE responds with its ML-related characteristics. These characteristics can be any of those listed above, as well as any others that are relevant for the network element to decide on provisioning of an ML model to the UE. Although not shown in FIG. 9, in some embodiments the network element can receive other indicia of trust for the UE from other NFs, such as:

- an indication of whether data traffic for the UE is according to a type associated with the UE;
- an indication of whether a movement pattern for the UE is according to a type or class associated with the UE; and
- an indication of previous network security problems in an area in which the UE is located.

These and other indicia of trust can be received from any of the following NFs:

- AMF, UPF, PCF, CHF, etc.;
- UE and/or subscriber information repository (e.g., UDM/UDR); and/or
- Security operations center (SOC), which can include a Network Intrusion Detection System (NIDS), a Manufacturer User Description (MUD) repository, and/or a Threat Intelligence function.

Figure 10:
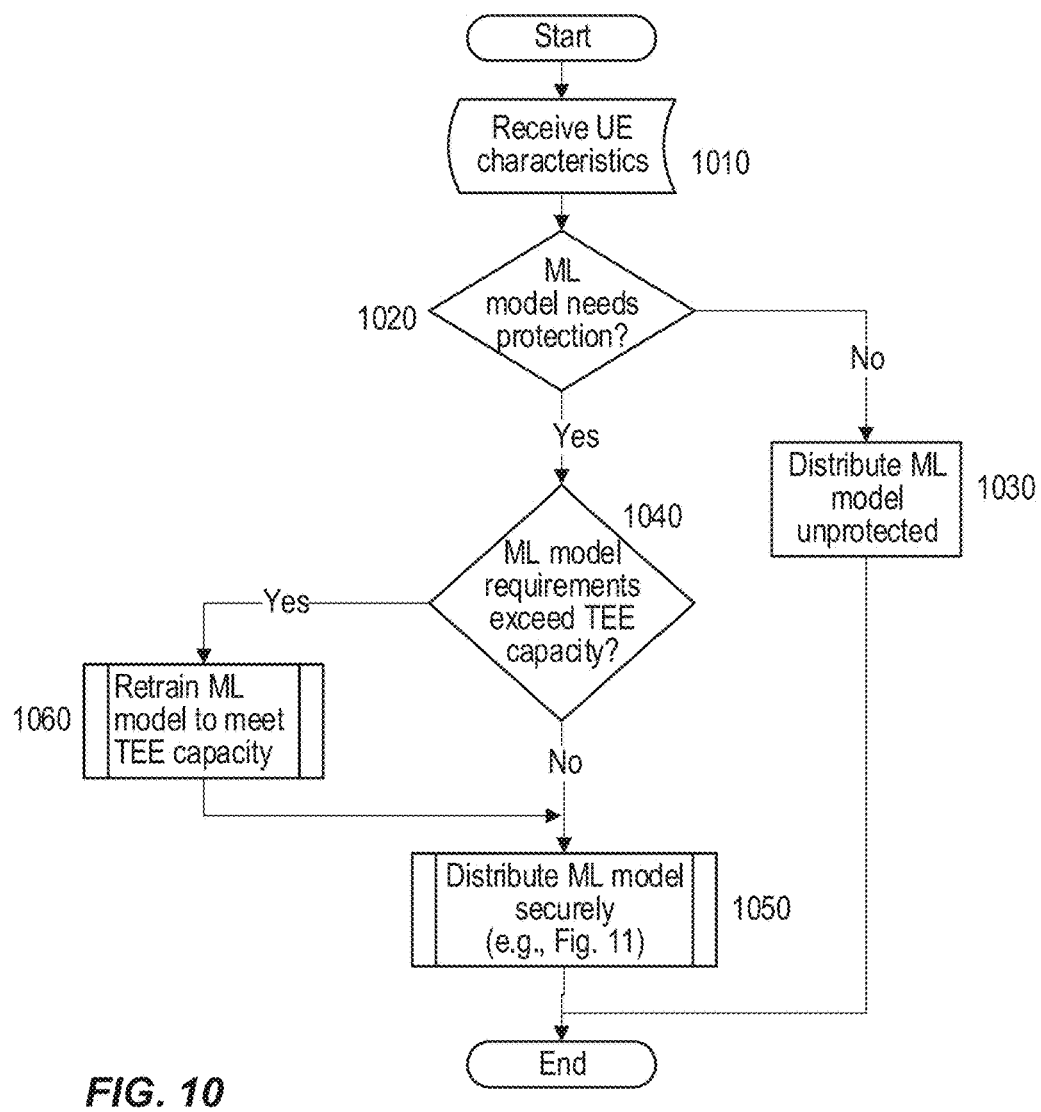
FIG. 10 is a flow diagram that illustrates an exemplary provisioning decision procedure for the network element shown in FIG. 9, according to various exemplary embodiments of the present disclosure.

FIG. 10 is a flow diagram that illustrates an exemplary provisioning decision procedure for the network element.

Initially, the network element can determine (in block 1020) whether the ML model needs to be protected, e.g., by execution in a TEE. Although shown as occurring after the network element receives the UE characteristics (block 1010), the order of these operations can also be reversed when the determination in block 1020 does not depend on the characteristics received in block 1010.

The network element can base the determination in block 1020 on various characteristics of the ML model, such as:

- an accuracy requirement (e.g., if using relatively inaccurate input data, such as approximate UE geolocation data determined based on signal strength, it may be suitable for non-trusted execution); and
- a duration of validity (e.g., if the model is only valid for a short duration, it may be suitable for non-trusted execution).

Additionally, in some cases, the network element can base the determination in block 1020 on various received characteristics of the UE and/or indicia of trust received from other NFs, such as:

- whether the UE is from a particular manufacturer, and/or is a certain type of device, that presents a security threat or risk.
- whether the UE behaves in a way that suggests lack of trust (e.g., IoT UE has traffic similar to a smartphone UE, smartphone UE behaving as aerial UE, etc.).
- whether there are indications/alerts, directly or by way of a Security Operations Center, from a Network Intrusion Detection System or from a Threat Intelligence source/feed, or deviations in behavior compared to Manufacturer User Description (MUD) information.
- historical information of jamming attacks in the area where the ML model is valid (e.g., number of false base stations detected is above a certain threshold value in a previous duration).

If the network element determines in block 1020 that no model protection is needed, then it can distribute the model unprotected to the UE (block 1030), without establishing a TEE in the UE. On the other hand, if the network element determines in block 1020 that model protection is needed, then in block 1040 the network element determines whether the requirements of the ML model (e.g., processing, memory, etc.) exceed the capacity and/or capabilities of the TEE. This can be based on any of the characteristics received from the UE (block 1010 and FIG. 9).

Figure 11:
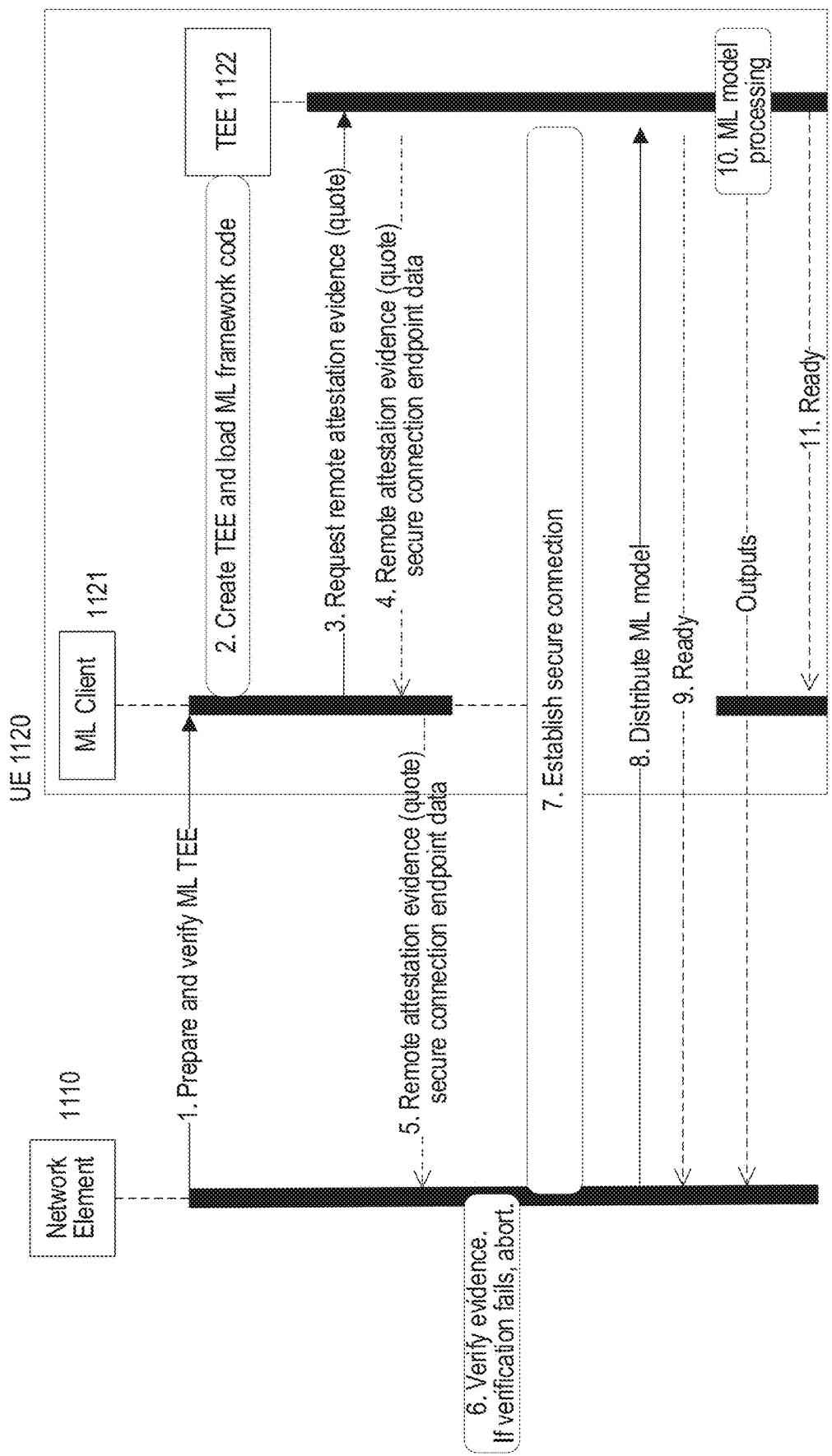
FIG. 11 shows a signal flow diagram of an exemplary procedure for distributing an ML model for execution in a trusted execution environment (TEE), according to various exemplary embodiments of the present disclosure.

If the network element determines in block 1040 that the model does not exceed TEE capacity and/or capabilities, the network element distributes the ML model securely to the UE. An exemplary procedure for this operation is shown in FIG. 11 and discussed in more detail below. On the other hand, if the network element determines in block 1040 that the ML model exceeds TEE capacity and/or capabilities, the network element retrains, partitions, compresses, and/or prunes the ML model to meet the TEE capacity and/or capabilities, and then proceeds to secure distribution in block 1050. An alternative to block 1060 is that the network element decides not to deploy the ML model when it exceeds the TEE capacity and/or capabilities.

FIG. 11 shows a signal flow diagram of an exemplary procedure for distributing an ML model for execution in a TEE, according to various exemplary embodiments of the present disclosure. The procedure is between a network element (1110) and a UE (1120), which includes an ML client (1121) and a TEE (1122). The network element and the UE can be the same as those shown in FIG. 9, discussed above. Although FIG. 11 shows various numbered operations, the numbers are used to facilitate explanation and do not require or imply a particular order of operations, unless stated in the description below.

In operation 1, the network element sends a request to the UE ML client to prepare and verify a TEE for the ML model. The included request to verify may contain a cryptographic challenge to be included in operation 3, described below. In operation 2, responsive to the request, the ML client creates that TEE and loads any ML framework needed to support the ML model. Such ML framework can be indicated by the request in operation 1, or it can be based on a preconfigured arrangement between the network element and the ML client. After the TEE has been created, in operation 3 the ML client requests a remote attestation (also referred to as "cryptographic attestation or "quote") pertaining to the TEE. In operation 4, the TEE sends the ML client the requested remote attestation. In addition, the TEE provides an endpoint (e.g., IP address, TCP socket, etc.) the network element can use for a secure connection with the TEE.

In operation 5, the ML client forwards the information received in operation 4 to the network element. In operation 6, the network element verifies the evidence of trust included in the remote attestation, e.g., against security requirements and/or parameters required to trust a TEE for provisioning and execution of the ML model. If the network element determines that the TEE cannot be trusted (i.e., the verification fails), the network element aborts the provisioning of the ML model. On the other hand, if the verification succeeds, in operation 7 the network element establishes a secure connection with the TEE using the endpoint information received in operation 5. This can be done via any suitable technique, such as transport layer security (TLS) based on digital certificates.

In operation 8, the network element provisions and/or distributes the ML model to the TEE via the secure connection previously established. Before doing so, the network element can train the ML model based on the received capabilities of the UE and/or the TEE. Considering the secondary carrier prediction example shown in FIG. 5, the network element (e.g., RAN node) can obtain data indicating locations of various UEs and corresponding signal levels (or qualities) of frequencies 1 and 2 in a coverage area (e.g., large cell in FIG. 5). The Communication network can then train an ML model by minimizing the loss between UE location (input) and the signal level or quality frequencies 1 and 2 (output). The Communication network can then send this trained ML model to the TEE, via the secure connection.

Optionally, in operation 9, the TEE sends a notification to the network element that the ML model is ready for processing in the TEE. Processing of the ML model in the TEE takes place in operation 10, including outputs to the network element as needed and/or desired. The processing may begin automatically, or the network element may explicitly initiate it (not shown in the figure). Considering the secondary carrier prediction example, the TEE can input the UE's geolocation (e.g., from GNSS receiver) to the ML model. The TEE may also use signal level and/or quality on frequency 1 at the location as a model input. The TEE outputs the predicted signal level or quality on frequency 2 at that location. The TEE can provide this output to the network element, as shown in FIG. 11.

This secondary carrier prediction use case is merely one example of embodiments where the outputs of the ML model are related to one or more UE operations in a RAN, which is used broadly to refer to both UE operations and RAN operations with respect to a UE. Other examples where ML model outputs related to UE operations in a RAN include:

Determining whether a UE is an aerial UE.
Power control setting in Uplink (UL) transmission
Predicting beamforming parameters (e.g., best beam) and/or compressed channel state information (CSI)
Prediction of random access parameters
Link adaptation, such as preferred selection of modulation and coding scheme
Mobility operations, e.g., the model output can include any of:
  Prediction of channel quality for a non-serving RAN node (e.g., transmitting a secondary carrier) or other performance metrics, such as
    Radio channel estimation in uplink and downlink,
    Channel quality indicator (CQI) estimation/selection,
    Signal to noise estimation for uplink and downlink,
    Signal to noise and interference estimation,
    Reference signal received power (RSRP) estimation, and
    Reference signal received quality (RSRQ) estimation.
  Prediction of forecasted signal quality/strength degradation
UE localization, e.g., predicted UE position.

In various embodiments, the processing performed by the TEE in operation 10 can include any of the following:
  training the ML model;
  updating the ML model;
  performing inference based on the ML model (e.g., of signal level/quality of frequency 2);
  monitoring inference performance of the ML model; and
  determining whether the ML models is outdated or invalid.

In some embodiments, the network element can determine which of these processing operations should be distributed to the TEE based on the characteristics of the UE/TEE. In such case, the network element can send, with the ML model, indications of which of these processing operations should be performed in the TEE. Additionally, the network element can perform the processing operations that were not distributed, i.e., based on the indications sent with the ML model.

Figure 12:
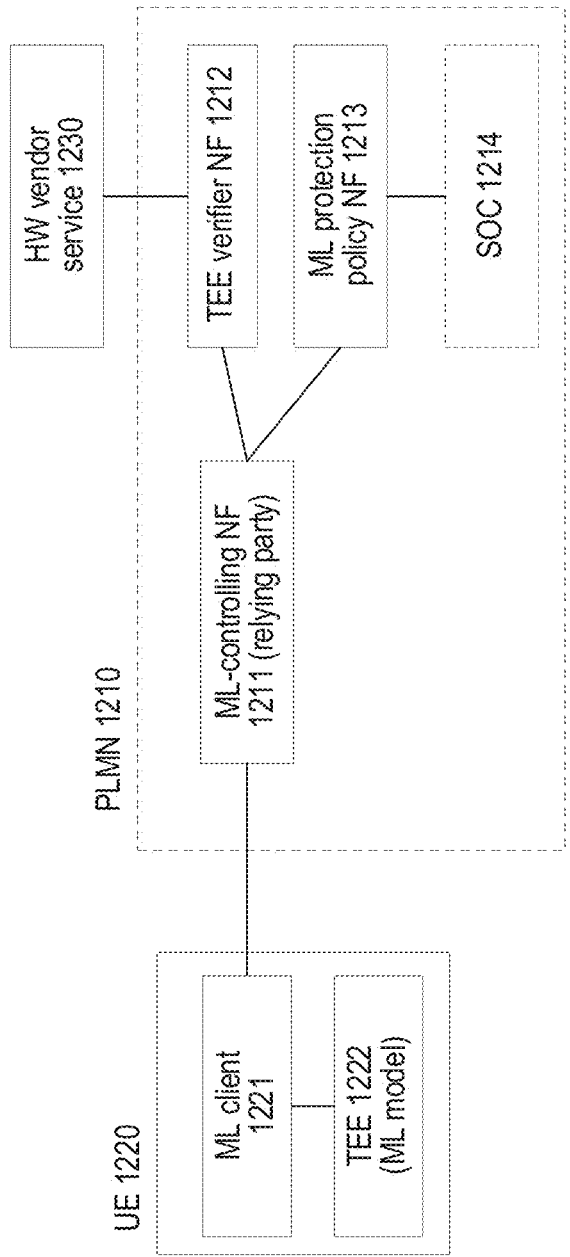
FIGS. 12-13 show various exemplary architectures for distributed ML processing, according to various exemplary embodiments of the present disclosure.

FIG. 12 shows an exemplary architecture for distributed ML processing, according to various exemplary embodiments of the present disclosure. In this architecture, a UE (1220) includes an ML client (1221) and a TEE (1222), which can receive and perform processing on an ML model. The UE and its included elements can be similar to those discussed above in relation to FIG. 11.

The architecture in FIG. 12 also includes a public land mobile network (PLMN 1210), which can also be referred to more generally as an exemplary communication network. The PLMN includes NFs include an ML-controlling NF (1211), a TEE verifier NF (1212), and an ML policy protection function (1213). These can be used cooperatively to perform the network-side operations in FIGS. 9-11, discussed above. For example, the ML-controlling NF can manage and/or control all communications with the UE's ML client and TEE. Similarly, the ML protection policy NF can make decisions and/or determinations about whether to distribute the ML model, and/or whether a TEE needs to be established for receiving a distributed ML model. Likewise, the TEE verifier NF can verify the cryptographic attestation received from the TEE, as a precondition for distributing the ML model to the TEE.

These NFs can communicate with each other in various ways, with the lines in FIG. 12 showing an exemplary internal communication arrangement. In some embodiments, the PLMN can also include a security operations center (1214) that can provide various other inputs to the ML protection policy NF. These inputs can come from various SOC components discussed above, including NIDS, MUD repository, and/or a Threat Intelligence function.

The architecture shown in FIG. 12 can also include a hardware (HW) vendor service (1230), which is external to the PLMN. This element can operate in somewhat different fashions depending on the model for remote attestation chosen by the hardware (HW) vendor. In general, the HW vendor should provide information necessary for the TEE verifier NF (1212) to be able to determine that it is a genuine HW part with a secure configuration and that the signature of the attestation is valid. As an example, Intel SGX technology currently offers two different models for attestation. In the original design, the HW vendor service (1230) would be exemplified by the "Intel Attestation Service", which exposes an API that a relying party can submit an attestation quote to for verification, and the TEE verifier NF (1212) would act as a relying party (to Intel IAS), in turn providing verification services to the ML-controlling NF (1211).

More recently, an alternative is available through the "Data Center Attestation Primitives", where the verification can be implemented locally in a data center and the local attestation service instead accesses an Intel service API to retrieve certificates necessary to perform the verification. In this case, the API to retrieve certificates and other information from Intel corresponds to the HW vendor service (1230), and the TEE verifier NF (1212) could be the local verifier service, or it could be a relying party to the local attestation service running somewhere locally but outside the PLMN (which would contact the HW vendor service).

Figure 13:
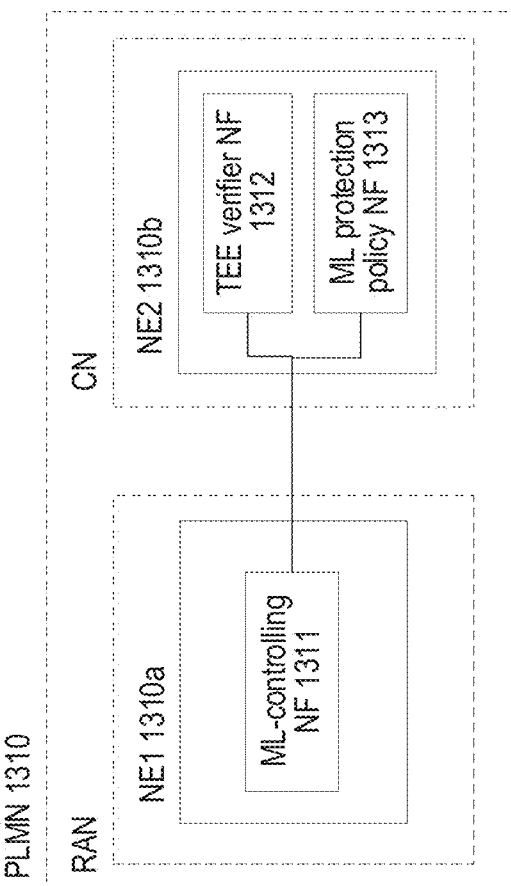

FIG. 13 shows an alternative architecture to FIG. 12, in which PLMN (1310) is divided into a RAN (e.g., NG-RAN)

and a core network (CN, e.g., 5GC). The RAN includes a first network element (NE1, 1310*a*) that hosts the ML-controlling NF (1311), and the CN includes a second network element (NE2, 1310*b*) that hosts the TEE verifier NF (1312) and the ML policy protection NF (1313). Each of these respective NFs can be substantially similar to identically-named NFs in FIG. 12.

Figure 14A:
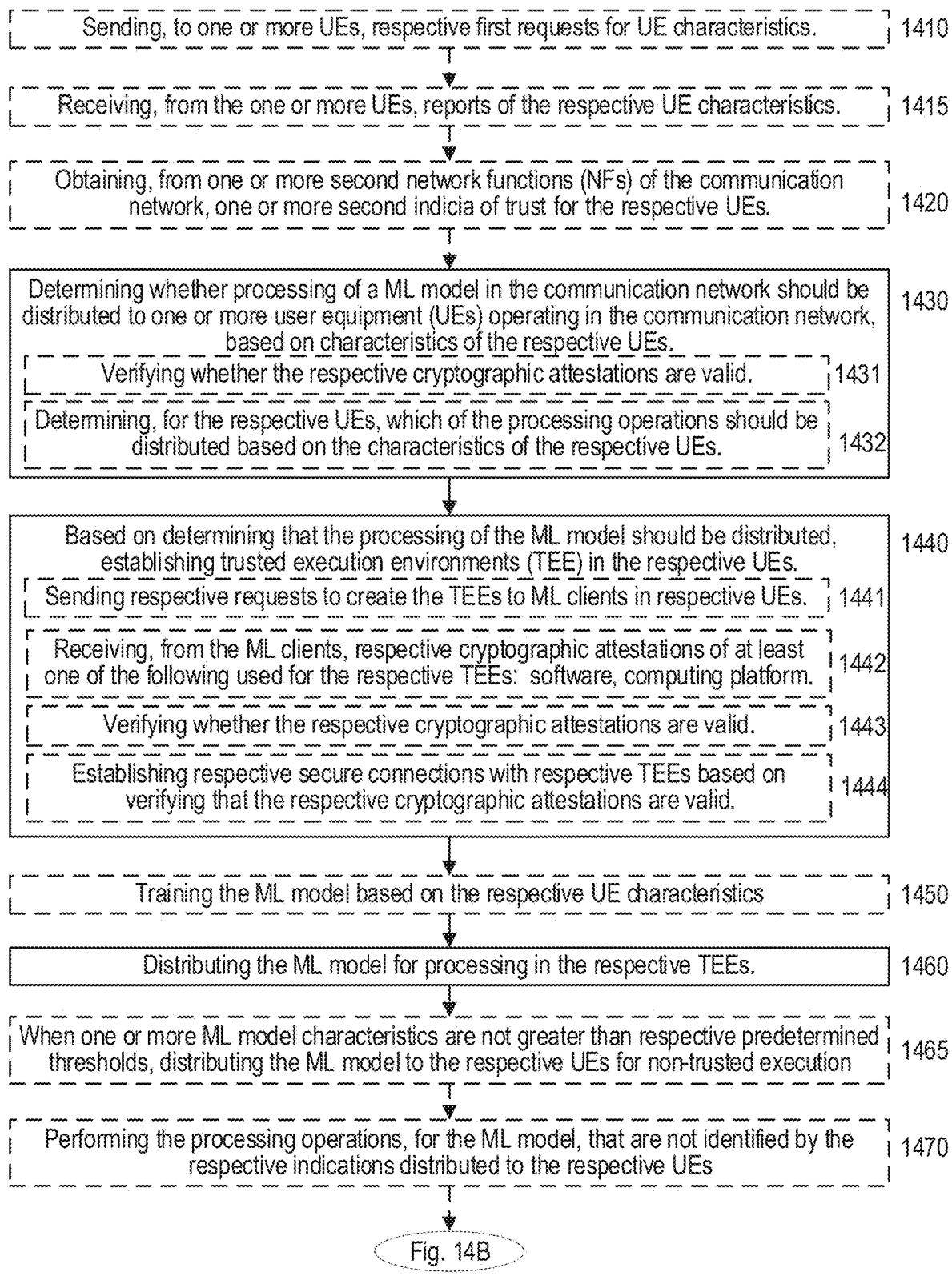
Figure 15:
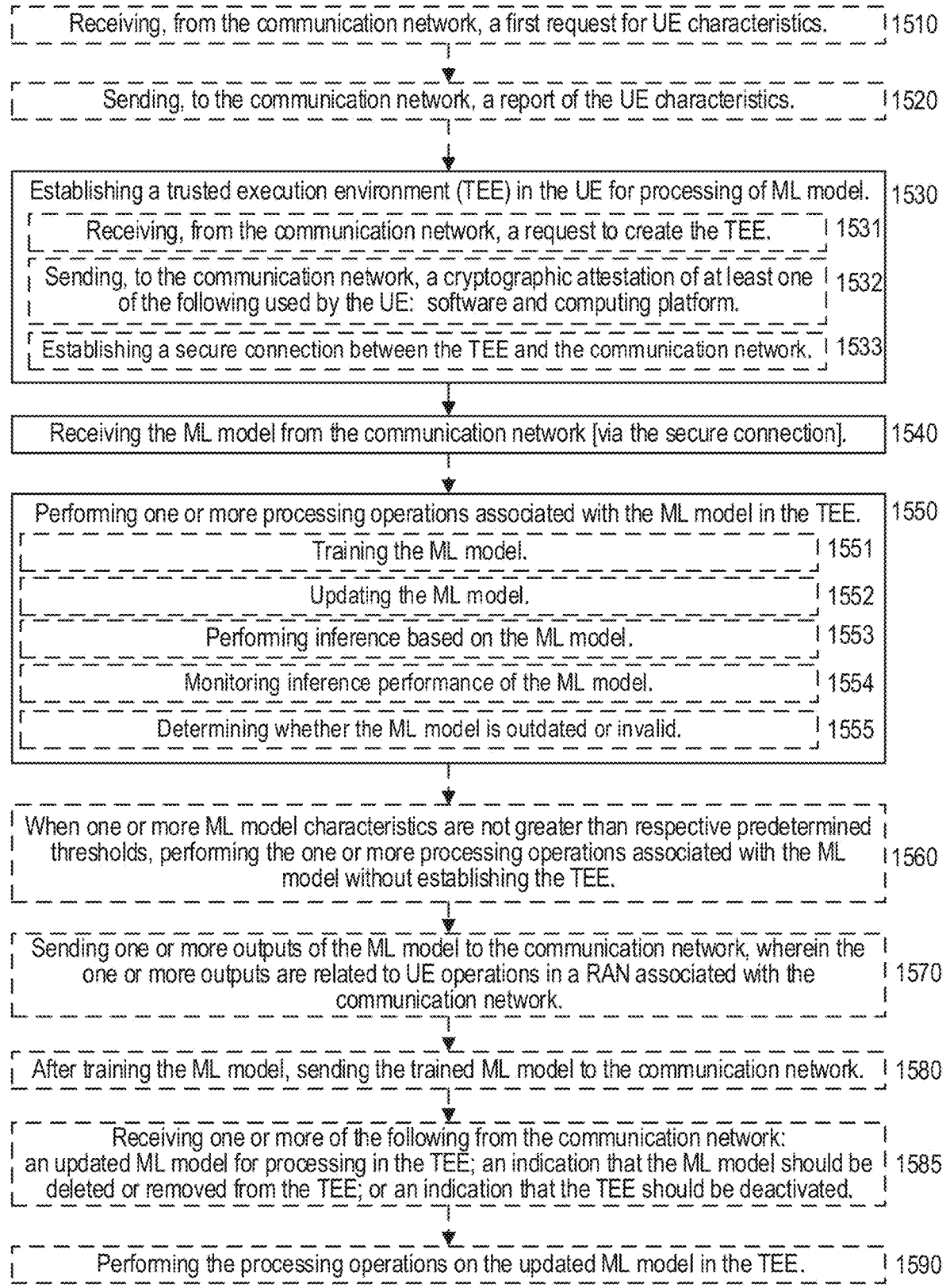
FIG. 15 shows a flow diagram of an exemplary method for a UE (e.g., wireless device), according to various exemplary embodiments of the present disclosure.

Various features of the embodiments described above correspond to various operations illustrated in FIGS. 14-15, which show exemplary methods (e.g., procedures) for a communication network and a UE, respectively. In other words, various features of the operations described below correspond to various embodiments described above. Furthermore, the exemplary methods shown in FIGS. 14-15 can be used cooperatively to provide various benefits, advantages, and/or solutions to problems described herein. Although FIGS. 14-15 show specific blocks in particular orders, the operations of the exemplary methods can be performed in different orders than shown and can be combined and/or divided into blocks having different functionality than shown. Optional blocks or operations are indicated by dashed lines.

In particular, FIG. 14 (which includes FIGS. 14A-B) shows an exemplary method (e.g., procedure) for managed machine learning (ML) in a communication network, according to various exemplary embodiments of the present disclosure. The exemplary method can be performed by one or more network functions (NFs) of the communication network (e.g., PLMN) and/or by network nodes hosting such NFs, including NFs and/or network nodes configured according to other figures described herein. In the following, it should be understood that an operation described as being performed by the communication network refers to the operation being performed by any NF and/or network node, of the communication network, that is configured, arranged, and/or suitable for performing such an operation.

The exemplary method can include the operations of block 1430, where the communication network can determine whether processing of a ML model in the communication network should be distributed to one or more user equipment (UEs) operating in the communication network, based on characteristics of the respective UEs. The exemplary method can also include the operations of block 1440, where the communication network can, based on determining that the processing of the ML model should be distributed to the one or more UEs, establish trusted execution environments (TEE) in the respective UEs. The exemplary method can also include the operations of block 1460, where the communication network can distribute the ML model for processing in the respective TEEs.

In some embodiments, the exemplary method can also include the operations of blocks 1410-1415, where the communication network can send, to the one or more UEs, respective first requests for UE characteristics; and receive, from the one or more UEs, reports of the respective UE characteristics. In such embodiments, determining whether the processing of the ML model should be distributed (e.g., in block 1430) is based on the respective reported UE characteristics. In some of these embodiments, the reported UE characteristics include any of the following:
UE manufacturer;
network subscription;
an identifier that is unique to the UE;
class, category, and/or type associated with the UE;
status of the UE's battery;
vendor and/or model of processing units in a UE computing platform;
processing capacity available in the UE computing platform;
configuration of available processing capacity;
memory available in the UE computing platform; and
one or more first indicia of trust for the UE computing platform.

In some of these embodiments, the first indicia of trust can include any of the following:
roots of trust from a manufacturer of a processing unit in the UE computing platform;
one or more types of trusted computing technology used in the UE computing platform; and
features that are enabled or disabled in the UE computing platform.

In such embodiments, the one or more types of trusted computing technology include any of the following: Intel Software Guard eXtensions (SGX), AMD Secure Encrypted Virtualization (SEV), and ARM TrustZone. Likewise, the configuration of available processing capacity can include indications of available baseband processing capacity and/or available application processing capacity.

In some of these embodiments, the exemplary method can also include the operations of block 1450, where the communication network can train the ML model based on the respective UE characteristics (e.g., received in block 1420). In such embodiments, the trained ML model is distributed for processing in the respective TEEs (e.g., io block 1460).

In some embodiments, the exemplary method can also include the operations of block 1420, where the communication network can obtain, from one or more second network functions (NFs) of the communication network, one or more second indicia of trust for the respective UEs. In such embodiments, determining whether the processing of the ML model should be distributed (e.g., in block 1430) can be based on the obtained second indicia of trust for the respective UEs. In various embodiments, the second indicia of trust for each particular UE can include one or more of the following:
an indication of whether data traffic for the particular UE is according to a type associated with the particular UE;
an indication of whether a movement pattern for the particular UE is according to a type or class associated with the particular UE; and
an indication of previous network security problems in an area in which the particular UE is located.

In some embodiments, the exemplary method can also include the operations of block 1420, where the communication network can receive outputs of the ML model from the respective TEEs. The outputs of the ML model are related to one or more UE operations in a RAN associated with the communication network. Various examples of UE operations in a RAN (including RAN operations with respect to a UE) were discussed above in more detail.

In some embodiments, establishing the respective TEEs (e.g., in block 1440) and distributing the ML model for processing in the respective TEEs (e.g., in block 1460) can be based on one or more ML model characteristics being greater than respective predetermined thresholds. For example, the one or more ML model characteristics can include an accuracy requirement and/or a duration of validity. In such embodiments, the exemplary method can also include the operations of block 1465, where the communication network can, when the one or more ML model characteristics are not greater than the respective predetermined thresholds, distribute the ML model to the respective UEs for non-trusted execution.

In some embodiments, establishing TEEs in the respective UEs in block 1440 can include the operations of sub-blocks 1442 and 1444. In sub-block 1442, the communication network can receive, from ML clients in the respective UEs, respective cryptographic attestations of software and/or computing platform used for the respective TEEs. In sub-block 1444, the communication network can establish respective secure connections with respective TEEs based on verifying that the respective cryptographic attestations are valid. In such case, the ML model is distributed to the respective TEEs (e.g., in block 1460) via the respective secure connections. Examples of these operations are shown in FIG. 11, discussed above.

In some of these embodiments, establishing TEEs in the respective UEs in block 1440 also includes the operations of sub-blocks 1441 and 1443. In sub-block 1441, the communication network can send respective requests to create the TEEs to the ML clients. In such case, the cryptographic attestations are received in response to the respective requests. In sub-block 1443, the communication network can verify whether the respective cryptographic attestations are valid. This arrangement is also illustrated in FIG. 11.

In other of these embodiments, the cryptographic attestations can be received in respective requests from the ML clients for the ML model. In such case, determining whether processing of a ML model in the communication network should be distributed comprises verifying whether the respective cryptographic attestations are valid in block 1430 can include the operations of sub-block 1431, where the communication network can verify whether the respective cryptographic attestations are valid.

In some embodiments, the exemplary method can also include the operations of block 1490, where the communication network can subsequently distribute one or more of the following to the respective TEEs:
- an updated ML model for processing in the respective TEEs;
- an indication that the ML model should be deleted or removed from the respective TEEs; or
- an indication that the respective TEEs should be deactivated.

In some of these embodiments, the exemplary method can also include the operations of blocks 1480-1485, where the communication network can obtain, from the respective UEs, the ML model trained in the respective TEEs; and combine the trained ML models into the updated ML model distributed to the respective TEEs (e.g., inn block 1490).

In some embodiments, for each of the UEs, the processing in the TEE includes one or more of the following processing operations: training the ML model; updating the ML model; performing inference based on the ML model; monitoring inference performance of the ML model; and determining whether the ML models is outdated or invalid.

In some of these embodiments, determining whether processing of a ML model in the communication network should be distributed in block 1430 can include the operations of sub-block 1432, where the communication network can determine, for the respective UEs, which of the processing operations should be distributed based on the respective characteristics of the respective UEs. Example characteristics and determinations were discussed above. In such case, the ML model can be distributed to the respective UEs (e.g., in block 1460) with respective indications of which processing operations should be performed by the respective UEs. Furthermore, in some of these embodiments, the exemplary method can also include the operations of block 1470, where the communication network can perform the processing operations, for the ML model, that are not identified by the respective indications distributed to the respective UEs. In other words, the communication network can perform the processing operations that are necessary but not delegated to the respective UEs.

In addition, FIG. 15 shows another exemplary method (e.g., procedure) for managed machine learning (ML) in a communication network, according to various exemplary embodiments of the present disclosure. The exemplary method can be performed by a UE (e.g., wireless device, IoT device, etc.) configured according to other figures described herein.

The exemplary method can include the operations of block 1530, where the UE can establish a trusted execution environment (TEE) in the UE for processing of an ML model. The exemplary method can also include the operations of block 1540, where the UE can receive the ML model from the communication network. The exemplary method can also include the operations of block 1550, where the UE can perform one or more processing operations associated with the ML model in the TEE.

In some embodiments, the exemplary method can also include the operations of blocks 1510-1520, where the UE can receive, from the communication network, a first request for UE characteristics; and send, to the communication network, a report of the UE characteristics. In some of these embodiments, the reported UE characteristics include any of the following:
- UE manufacturer;
- network subscription;
- an identifier that is unique to the UE;
- class, category, and/or type associated with the UE;
- status of the UE's battery;
- vendor and/or model of processing units in a UE computing platform;
- processing capacity available in the UE computing platform;
- configuration of available processing capacity;
- memory available in the UE computing platform; and
- one or more first indicia of trust for the UE computing platform.

In some of these embodiments, the first indicia of trust can include any of the following:
- roots of trust from a manufacturer of a processing unit in the UE computing platform;
- one or more types of trusted computing technology used in the UE computing platform; and
- features that are enabled or disabled in the UE computing platform.

In such embodiments, the one or more types of trusted computing technology can include any of the following: Intel Software Guard eXtensions (SGX), AMD Secure Encrypted Virtualization (SEV), and ARM TrustZone. Likewise, the configuration of available processing capacity can include indications of available baseband processing capacity and/or available application processing capacity.

In some embodiments, the received ML model (e.g., in block 1540) has been trained (e.g., by the communication network) based on the reported UE characteristics.

In some embodiments, the TEE is established when one or more ML model characteristics are greater than respective predetermined thresholds (e.g., as determined by the communication network, discussed above). For example, the one or more ML model characteristics can include an accuracy requirement and/or a duration of validity. In some embodiments, when the one or more ML model characteristics are not greater than the respective predetermined thresholds, the ML model is received from the communication network with a request for non-trusted execution and the exemplary method can also include the operations of block 1560, where the UE can perform the one or more processing operations associated with the ML model without establishing the TEE.

In some embodiments, the exemplary method can also include the operations of block 1570, where the UE can send one or more outputs of the ML model to the communication network. The one or more outputs are related to UE operations in a RAN associated with the communication network. Various examples of UE operations in a RAN (including RAN operations with respect to a UE) were discussed above in more detail.

In some embodiments, establishing the TEE in block 1530 can include the operations of sub-blocks 1532-1533, which are performed by an ML client in the UE. In sub-block 1532, the ML client can send, to the communication network, a cryptographic attestation of software and computing platform used by the UE (i.e., for the TEE). In sub-block 1533, the ML client can establish a secure connection between the TEE and the communication network. The ML mode can be received (e.g., in block 1540) via the secure connection.

In some of these embodiments, establishing the TEE in block 1530 can also include the operations of sub-block 1531, where the ML client can receive, from the communication network, a request to create the TEE. In such case, the cryptographic attestation is sent (e.g., in sub-block 1532) in response to the request. An example of these embodiments is illustrated in FIG. 11. In other embodiments, the cryptographic attestation can be sent (i.e., by the ML client) in a request for the ML model.

In various embodiments, the processing operations performed in the TEE (e.g., in block 1550) can include one or more of the following: training the ML model (sub-block 1551); updating the ML model (sub-block 1552); performing inference based on the ML model (sub-block 1553); monitoring inference performance of the ML model (sub-block 1554); and determining whether the ML model is outdated or invalid (sub-block 155). In some of these embodiments, the ML model can be received (e.g., in block 1540) with an indication of which processing operations should be performed by the UE (e.g., in block 1550).

In some of these embodiments, the exemplary method can also include the operations of block 1585, where the UE can subsequently receive one or more of the following from the communication network:
 an updated ML model for processing in the TEE;
 an indication that the ML model should be deleted or removed from the TEE; or
 an indication that the TEE should be deactivated.

In some of these embodiments, the exemplary method can also include the operations of blocks 1580-1590. In block 1580, after training the ML model (e.g., in sub-block 1551), the UE can send the trained ML model to the communication network. The updated ML mode can be received (e.g., in block 1585) in response. In block 1590, the UE can perform the processing operations on the updated ML model in the TEE.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 16:
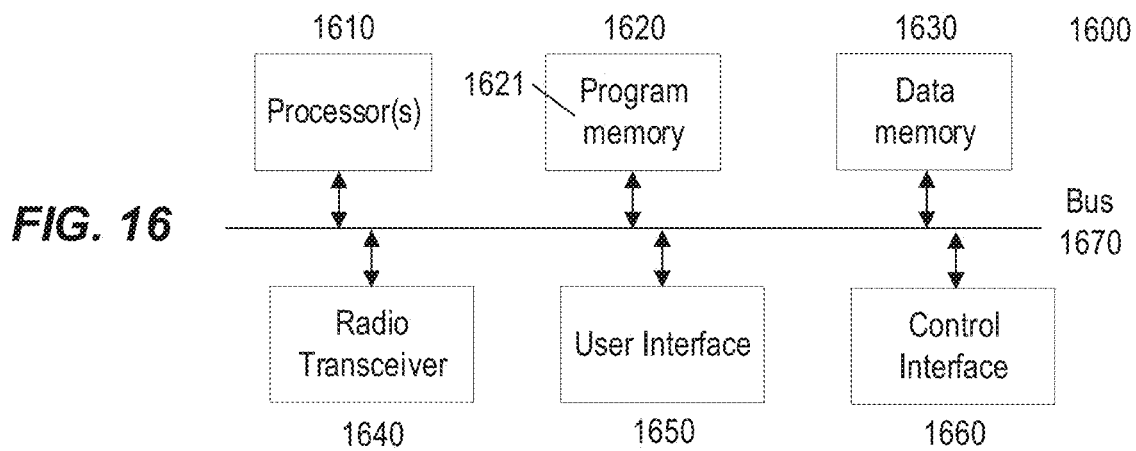
FIG. 16 shows a block diagram of an exemplary UE (e.g., wireless device), according to various exemplary embodiments of the present disclosure.

FIG. 16 shows a block diagram of an exemplary wireless device or user equipment (UE) 1600 (hereinafter referred to as "UE 1600") according to various embodiments of the present disclosure, including those described above with reference to other figures. For example, UE 1600 can be configured by execution of instructions, stored on a computer-readable medium, to perform operations corresponding to one or more of the exemplary methods described herein.

UE 1600 can include a processor 1610 (also referred to as "processing circuitry") that can be operably connected to a program memory 1620 and/or a data memory 1630 via a bus 1670 that can comprise parallel address and data buses, serial ports, or other methods and/or structures known to those of ordinary skill in the art. Program memory 1620 can store software code, programs, and/or instructions (collectively shown as computer program product 1621 in FIG. 16) that, when executed by processor 1610, can configure and/or facilitate UE 1600 to perform various operations, including operations corresponding to various exemplary methods described herein. As part of or in addition to such operations, execution of such instructions can configure and/or facilitate UE 1600 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1640, user interface 1650, and/or control interface 1660.

As another example, processor 1610 can execute program code stored in program memory 1620 that corresponds to MAC, RLC, PDCP, SDAP, RRC, and NAS layer protocols standardized by 3GPP (e.g., for NR and/or LTE). As a further example, processor 1610 can execute program code stored in program memory 1620 that, together with radio transceiver 1640, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1610 can execute program code stored in program memory 1620 that, together with radio transceiver 1640, implements device-to-device (D2D) communications with other compatible devices and/or UEs.

Program memory 1620 can also include software code executed by processor 1610 to control the functions of UE 1600, including configuring and controlling various components such as radio transceiver 1640, user interface 1650, and/or control interface 1660. Program memory 1620 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1620 can comprise an external storage arrangement (not shown) remote from UE 1600, from which the instructions can be downloaded into program memory 1620 located within or removably coupled to UE 1600, so as to enable execution of such instructions.

Data memory 1630 can include memory area for processor 1610 to store variables used in protocols, configuration, control, and other functions of UE 1600, including operations corresponding to, or comprising, any of the exemplary methods described herein. Moreover, program memory 1620 and/or data memory 1630 can include non-volatile memory (e.g., flash memory), volatile memory (e.g., static or dynamic RAM), or a combination thereof. Furthermore, data memory 1630 can comprise a memory slot by which removable memory cards in one or more formats (e.g., SD Card, Memory Stick, Compact Flash, etc.) can be inserted and removed.

Persons of ordinary skill will recognize that processor 1610 can include multiple individual processors (including, e.g., multi-core processors), each of which implements a portion of the functionality described above. In such cases, multiple individual processors can be commonly connected to program memory 1620 and data memory 1630 or individually connected to multiple individual program memories and or data memories. More generally, persons of ordinary skill in the art will recognize that various protocols and other functions of UE 1600 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1640 can include radio-frequency transmitter and/or receiver functionality that facilitates the UE 1600 to communicate with other equipment supporting like wireless communication standards and/or protocols. In some exemplary embodiments, the radio transceiver 1640 includes one or more transmitters and one or more receivers that enable UE 1600 to communicate according to various protocols and/or methods proposed for standardization by 3GPP and/or other standards bodies. For example, such functionality can operate cooperatively with processor 1610 to implement a PHY layer based on OFDM, OFDMA, and/or SC-FDMA technologies, such as described herein with respect to other figures.

In some exemplary embodiments, radio transceiver 1640 includes one or more transmitters and one or more receivers that can facilitate the UE 1600 to communicate with various LTE, LTE-Advanced (LTE-A), and/or NR networks according to standards promulgated by 3GPP. In some exemplary embodiments of the present disclosure, the radio transceiver 1640 includes circuitry, firmware, etc. necessary for the UE 1600 to communicate with various NR, NR-U, LTE, LTE-A, LTE-LAA, UMTS, and/or GSM/EDGE networks, also according to 3GPP standards. In some embodiments, radio transceiver 1640 can include circuitry supporting D2D communications between UE 1600 and other compatible devices.

In some embodiments, radio transceiver 1640 includes circuitry, firmware, etc. necessary for the UE 1600 to communicate with various CDMA2000 networks, according to 3GPP2 standards. In some embodiments, the radio transceiver 1640 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1640 can include a transceiver that is capable of wired communication, such as by using IEEE 802.3 Ethernet technology. The functionality particular to each of these embodiments can be coupled with and/or controlled by other circuitry in the UE 1600, such as the processor 1610 executing program code stored in program memory 1620 in conjunction with, and/or supported by, data memory 1630.

User interface 1650 can take various forms depending on the particular embodiment of UE 1600, or can be absent from UE 1600 entirely. In some embodiments, user interface 1650 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1600 can comprise a tablet computing device including a larger touchscreen display. In such embodiments, one or more of the mechanical features of the user interface 1650 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1600 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1600 having a touch screen display are capable of receiving user inputs, such as inputs related to exemplary methods described herein or otherwise known to persons of ordinary skill.

In some embodiments, UE 1600 can include an orientation sensor, which can be used in various ways by features and functions of UE 1600. For example, the UE 1600 can use outputs of the orientation sensor to determine when a user has changed the physical orientation of the UE 1600's touch screen display. An indication signal from the orientation sensor can be available to any application program executing on the UE 1600, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1660 of the UE 1600 can take various forms depending on the particular exemplary embodiment of UE 1600 and of the particular interface requirements of other devices that the UE 1600 is intended to communicate with and/or control. For example, the control interface 1660 can comprise an RS-232 interface, a USB interface, an HDMI interface, a Bluetooth interface, an IEEE ("Firewire") interface, an $I^2C$ interface, a PCMCIA interface, or the like. In some exemplary embodiments of the present disclosure, control interface 1660 can comprise an IEEE 802.3 Ethernet interface such as described above. In some exemplary embodiments of the present disclosure, the control interface 1660 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1600 can comprise more functionality than is shown in FIG. 16 including, for example, a video and/or still-image camera, microphone, media player and/or recorder, etc. Moreover, radio transceiver 1640 can include circuitry necessary to communicate using additional radio-frequency communication standards including Bluetooth, GPS, and/or others. Moreover, the processor 1610 can execute software code stored in the program memory 1620 to control such additional functionality. For example, directional velocity and/or position estimates output from a GPS receiver can be available to any application program executing on the UE 1600, including any program code corresponding to and/or embodying any exemplary embodiments (e.g., of methods) described herein.

Figure 17:
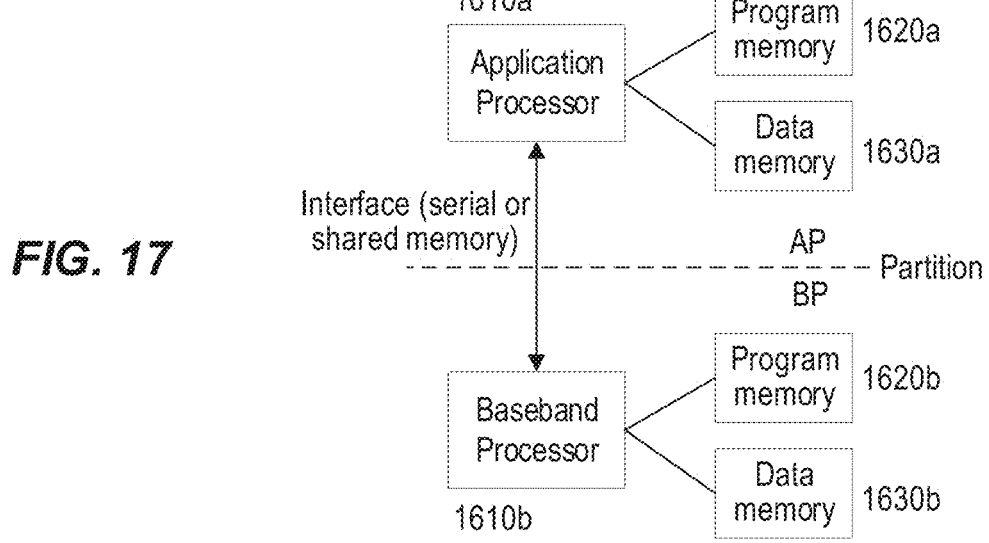
FIG. 17 shows a block diagram of an exemplary configuration of a processor, program memory, and data memory, according to various embodiments of the present disclosure.

FIG. 17 shows a block diagram of an exemplary configuration of processor 1610, program memory 1620, and data memory 1630 shown in FIG. 16, according to various embodiments of the present disclosure. In this configuration, processor 1610 includes application processor (AP) 1610a and baseband processor (BP) 1610b, which are connected via an interface. Exemplary interfaces include USB, HDMI, IEEE 1394 ("Firewire"), I²C, SPI, PCMCIA, or the like. Alternately, the interface between application processor 1610a and baseband processor 1610b can be via a shared data memory (e.g., in 1630). Functionality of UE 1600 can be partitioned between application processor 1610a and baseband processor 1610b in the manner described elsewhere herein.

Application processor 1610a communicates with program memory 1620a and data memory 1630a. Similarly, baseband processor 1610b communicates with program memory 1620b and data memory 1630b. In some embodiments, these hardware components can be used to provide a trusted execution environment (TEE) on the AP side or the BP side of the partition. For example, the AP side and/or the BP side can include functionality such as Intel SGX, AMD SEV, and/or ARM TrustZone, depending on the manufacturer of the processor used.

Figure 18:
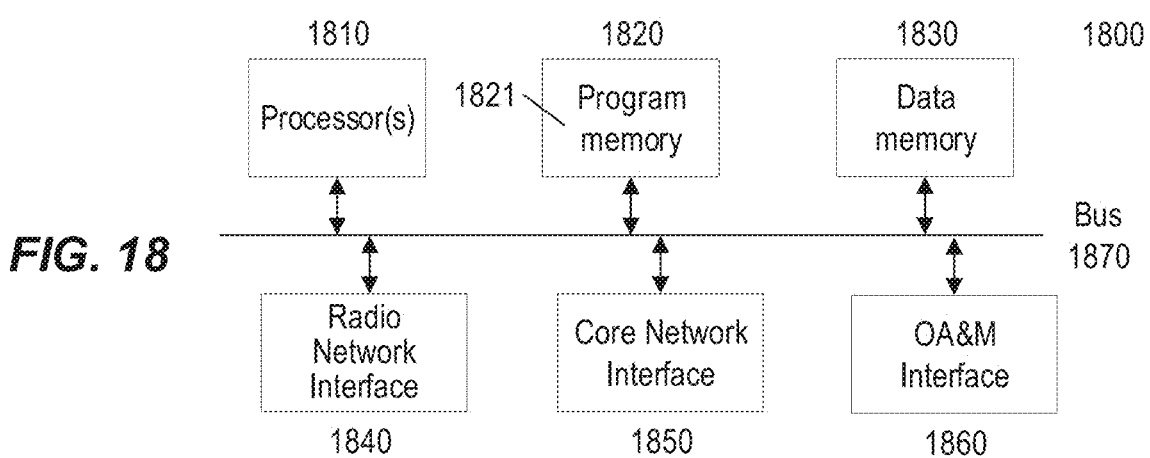
FIG. 18 shows a block diagram of an exemplary network node (e.g., base station, eNB, gNB, ng-eNB, etc.), according to various exemplary embodiments of the present disclosure.

FIG. 18 shows a block diagram of an exemplary network node 1800 according to various embodiments of the present disclosure, including those described above with reference to other figures. For example, exemplary network node 1800 can be configured by execution of instructions, stored on a computer-readable medium, to perform operations corresponding to one or more of the exemplary methods described herein. In some exemplary embodiments, network node 1800 can comprise a base station, eNB, gNB, or one or more components thereof. For example, network node 1800 can be configured as a central unit (CU) and one or more distributed units (DUs) according to NR gNB architectures specified by 3GPP. More generally, the functionally of network node 1800 can be distributed across various physical devices and/or functional units, modules, etc.

Network node 1800 can include processor 1810 (also referred to as "processing circuitry") that is operably connected to program memory 1820 and data memory 1830 via bus 1870, which can include parallel address and data buses, serial ports, or other methods and/or structures known to those of ordinary skill in the art.

Program memory 1820 can store software code, programs, and/or instructions (collectively shown as computer program product 1821 in FIG. 18) that, when executed by processor 1810, can configure and/or facilitate network node 1800 to perform various operations, including operations corresponding to various exemplary methods described herein. As part of and/or in addition to such operations, program memory 1820 can also include software code executed by processor 1810 that can configure and/or facilitate network node 1800 to communicate with one or more other UEs or network nodes using other protocols or protocol layers, such as one or more of the PHY, MAC, RLC, PDCP, SDAP, RRC, and NAS layer protocols standardized by 3GPP for LTE, LTE-A, and/or NR, or any other higher-layer protocols utilized in conjunction with radio network interface 1840 and/or core network interface 1850. By way of example, core network interface 1850 can comprise the S1 or NG interface and radio network interface 1840 can comprise the Uu interface, as standardized by 3GPP. Program memory 1820 can also comprise software code executed by processor 1810 to control the functions of network node 1800, including configuring and controlling various components such as radio network interface 1840 and core network interface 1850.

Data memory 1830 can comprise memory area for processor 1810 to store variables used in protocols, configuration, control, and other functions of network node 1800. As such, program memory 1820 and data memory 1830 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1810 can include multiple individual processors (not shown), each of which implements a portion of the functionality described above. In such case, multiple individual processors may be commonly connected to program memory 1820 and data memory 1830 or individually connected to multiple individual program memories and/or data memories. More generally, persons of ordinary skill will recognize that various protocols and other functions of network node 1800 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1840 can comprise transmitters, receivers, signal processors, ASICs, antennas, beamforming units, and other circuitry that enables network node 1800 to communicate with other equipment such as, in some embodiments, a plurality of compatible user equipment (UE). In some embodiments, interface 1840 can also enable network node 1800 to communicate with compatible satellites of a satellite communication network. In some exemplary embodiments, radio network interface 1840 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1840. According to further exemplary embodiments of the present disclosure, the radio network interface 1840 can comprise a PHY layer based on OFDM, OFDMA, and/or SC-FDMA technologies. In some embodiments, the functionality of such a PHY layer can be provided cooperatively by radio network interface 1840 and processor 1810 (including program code in memory 1820).

Core network interface 1850 can comprise transmitters, receivers, and other circuitry that enables network node 1800 to communicate with other equipment in a core network such as, in some embodiments, circuit-switched (CS) and/or packet-switched Core (PS) networks. In some embodiments, core network interface 1850 can comprise the S1 interface standardized by 3GPP. In some embodiments, core network interface 1850 can comprise the NG interface standardized by 3GPP. In some exemplary embodiments, core network interface 1850 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1850 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1800 can include hardware and/or software that configures and/or facilitates network node 1800 to communicate with other network nodes in a RAN, such as with other eNBs, gNBs, ng-eNBs, en-gNBs, IAB nodes, etc. Such hardware and/or software can be part of radio network interface 1840 and/or core network interface 1850, or it can be a separate functional unit (not shown). For example, such hardware and/or software can configure and/or facilitate network node 1800 to communicate with other RAN nodes via the X2 or Xn interfaces, as standardized by 3GPP.

OA&M interface 1860 can comprise transmitters, receivers, and other circuitry that enables network node 1800 to communicate with external networks, computers, databases, and the like for purposes of operations, administration, and maintenance of network node 1800 or other network equipment operably connected thereto. Lower layers of OA&M interface 1860 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1840, core network interface 1850, and OA&M interface 1860 may be multiplexed together on a single physical interface, such as the examples listed above.

Figure 19:
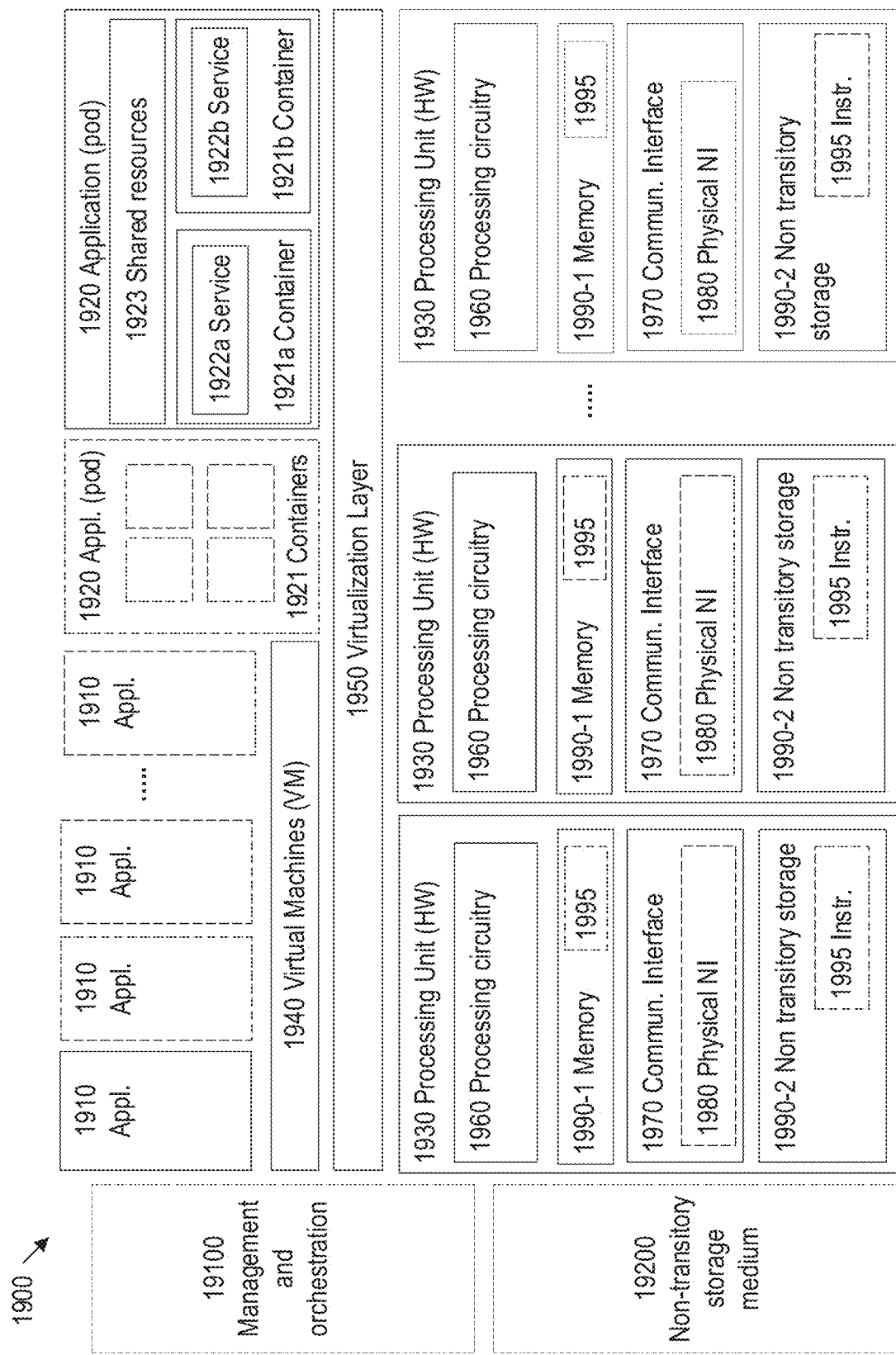
FIG. 19 is a block diagram of an exemplary computing platform that can be used host NFs of a communication network, according to various exemplary embodiments of the present disclosure.

FIG. 19 is a block diagram of an exemplary computing platform that can be used to host NFs of a communication network, according to various embodiments described above. For example, the computing platform in FIG. 19 can host any of the NFs and/or network elements described above that perform distribution and/or processing of an ML model for managed ML.

In the exemplary arrangement shown in FIG. 19, functions are implemented as virtual components executed by one or more virtual machines in virtual environment 1900 hosted by a plurality of processing units 1930. Such processing units can be computing machines arranged in a cluster (e.g., such as in a data center or customer premise equipment (CPE)) where many hardware nodes work together and are managed via management and orchestration (MANO) function 19100, which, among other tasks, oversees lifecycle management of various applications 1910 and/or 1920. In some embodiments, however, such virtual components can be executed by one or more physical computing machines, e.g., without (or with less) virtualization of the underlying resources of processing units 1930.

In some embodiments, processing units 1930 can be commercial off-the-shelf (COTS) units, such as graphics processing units (GPUs), rack-mounted x86 server boards (e.g., based on Intel or AMD processors), reduced instruction-set computer (RISC, e.g., ARM) boards, etc. Each processing unit 1930 can include processing circuitry 1960 and memory 1990. Memory 1990 can include non-persistent memory 1990-1 (e.g., for permanent or semi-permanent storage) and persistent memory 1990-2 (e.g., for temporary storage), each of which can store instructions 1995 (also referred to as software or computer program product).

Processing circuitry 1960 can include general-purpose or special-purpose hardware devices, such as one or more Intel x86-family processors (or equivalent), reduced instruction-set computing (RISC) processors (e.g., ARM), stream or vector multiprocessors, application-specific integrated circuits (ASICs), or any other type of processing circuitry including digital or analog hardware components. Each processing unit 1930 can include one or more high-speed communication interfaces 1970, each of which can include a physical network interface 1980. The respective communication interfaces 1970 can be used for communication among the processing units 1930, and/or with other computing hardware internal and/or external to system 1900.

Memory 1990 can store instructions 1995 executable by processing circuitry 1960 whereby various applications 1910 and/or 1920 can be operative for various features, functions, procedures, etc. of the embodiments disclosed herein. For example, instructions 1995 can include program instructions that, when executed by processing circuitry 1960, can configure processing unit 1930 to perform operations corresponding to the methods or procedures described herein, including those related to embodiments of the TRS.

Memory 1990 can also store instructions 1995 executable by processing circuitry 1960 to instantiate one or more virtualization layers 1950 (also referred to as hypervisor or virtual machine monitor, VMM). In some embodiments, virtualization layer 1950 can be used to provide a plurality of virtual machines (VMs) 1940 that are abstracted from the underlying processing units 1930. For example, virtualization layer 1950 can present a virtual operating platform that appears like computing hardware to containers and/or pods hosted by environment 1900. Moreover, each VM (e.g., as facilitated by virtualization layer 1950) can manifest itself as a software implementation of a physical machine that runs programs as if they were executing on a physical, non-virtualized machine. Each VM can have dedicated processing units 1930 or can share resources of one or more processing units 1930 with other VMs.

Memory 1990 can store software to execute each VM 1940 as well as software allowing a VM 1940 to execute functions, features and/or benefits described in relation with some embodiments described herein. VMs 1940 can include virtual processing, virtual memory, virtual networking or interface and virtual storage, and can be run by virtualization layer 1950. As shown in FIG. 19, various applications 1910 can run on VMs 1940.

As a specific example, applications 1910 can be implemented in WebAssembly, a binary instruction format designed as a portable compilation target for programming languages. In other words, virtualization layer 1950 can provide VMs 1940 that are capable of running applications, that are compiled into WebAssembly executables. As another specific example, virtualization layer 1950 can provide Java VMs 1940 that are capable of running applications written in the Java programming language or written in other programming languages and compiled into Java byte code.

In other embodiments, virtualization layer 1950 can host various applications 1920 arranged in pods. Each pod can include one or more containers 1921, such as 1921*a-b* shown for a particular application 1920 in FIG. 19. Container 1921*a-b* can encapsulate respective services 1922*a-b* of a particular application 1920. For example, a "pod" (e.g., a Kubernetes pod) can be a basic execution unit of an application, i.e., the smallest and simplest unit that can be created and deployed in environment 1900. Each pod can include a plurality of resources shared by containers within the pod (e.g., resources 1923 shared by containers 1921a-b). For example, a pod can represent processes running on the processing units (or VMs) and can encapsulates an application's containers (including services therein), storage resources, a unique network IP address, and options that govern how the container(s) should run. In general, containers can be relatively decoupled from underlying physical or virtual computing infrastructure.

In some embodiments, some or all of processing units 1930 can include, or be implemented as, trusted computing hardware such as described elsewhere herein. For example, these trusted processing units can have hardware features such as Intel SGX, AMD SEV, and/or ARM TrustZone. Likewise, some or all of containers 1921 can be implemented as secure containers such as illustrated in FIG. 2. In this manner, services 1922 running in the secure containers 1921 on trusted processing units 1930 can be trusted computing services (TCS), as described elsewhere herein. Similarly, some or all of VMs 1940 can be trusted VMs that are usable to provide TCS for applications 1910.

In some embodiments, computing platform 1900 can include a non-transitory storage medium 19200 that can be used to store and retrieve information related to MANO 19100 or other functionality that is not specific to any of the processing units, VMs, etc.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A method for managed machine learning, ML, in a communication network, the method performed by a user equipment, UE, and comprising:
   sending (1520), to the communication network, a report of UE characteristics;
   establishing (1530) a trusted execution environment, TEE, in the UE for processing of an ML model;
   receiving (1540) the ML model from the communication network, wherein the received ML model has been trained based on the reported UE characteristics; and
   performing (1550), in the TEE, one or more processing operations associated with the received ML model.

2. A method for managed machine learning, ML, in a communication network, the method performed by one or more first network functions, NFs, of the communication network and comprising:
   receiving (1415), from one or more user equipment, UEs, operating in the communication network, reports of respective UE characteristics;
   determining (1430) whether processing of a ML model in the communication network should be distributed to the one or more UEs, based on the respective UEs characteristics;

based on determining that the processing of the ML model should be distributed to the one or more UEs, establishing (1440) trusted execution environments, TEEs, in the respective UEs;

training (1450) the ML model based on the respective UE characteristics; and distributing (1460) the trained ML model for processing in the respective TEEs.

3. The method of claim 2, wherein for each UE, the reported UE characteristics include any of the following:
UE manufacturer;
network subscription;
an identifier that is unique to the UE;
class, category, and/or type associated with the UE;
status of the UE's battery;
vendor and/or model of processing units in a UE computing platform;
processing capacity available in the UE computing platform;
configuration of available processing capacity;
memory available in the UE computing platform; and
one or more first indicia of trust for the UE computing platform.

4. The method of claim 3, wherein the first indicia of trust include any of the following:
roots of trust from a manufacturer of a processing unit in the UE computing platform;
one or more types of trusted computing technology used in the UE computing platform; and
features that are enabled or disabled in the UE computing platform.

5. The method of claim 4, wherein the one or more types of trusted computing technology include any of the following:
Intel Software Guard eXtensions, SGX;
AMD Secure Encrypted Virtualization, SEV; and
ARM TrustZone.

6. The method of claim 3, wherein the configuration of available processing capacity includes indications of one or more of the following:
available baseband processing capacity; and
available application processing capacity.

7. The method of claim 2, further comprising:
sending (1410), to the one or more UEs, respective first requests for UE characteristics,
wherein the reports are received in response to the respective first requests.

8. The method of claim 2, wherein:
the method further comprises obtaining (1420), from one or more second NFs of the communication network, one or more second indicia of trust for the respective UEs; and
determining (1430) whether the processing of the ML model should be distributed is further based on the obtained second indicia of trust for the respective UEs.

9. The method of claim 8, wherein the second indicia of trust for each particular UE include one or more of the following:
an indication of whether data traffic for the particular UE is according to a type associated with the particular UE;
an indication of whether a movement pattern for the particular UE is according to a type or class associated with the particular UE; and
an indication of previous network security problems in an area in which the particular UE is located.

10. The method of claim 2, further comprising receiving (1475) outputs of the ML model from the respective TEEs, wherein the outputs of the ML model are related to one or more UE operations in a radio access network, RAN, associated with the communication network.

11. The method of claim 2, wherein:
establishing (1440) the respective TEEs and distributing (1460) the trained ML model for processing in the respective TEEs are based on one or more ML model characteristics being greater than respective predetermined thresholds; and
the method further comprises, when the one or more ML model characteristics are not greater than the respective predetermined thresholds, distributing (1465) the trained ML model to the respective UEs for non-trusted execution.

12. The method of claim 11, wherein the one or more ML model characteristics include any of the following:
an accuracy requirement; and
a duration of validity.

13. The method of claim 2, wherein establishing (1440) TEEs in the respective UEs comprises:
receiving (1442), from ML clients in the respective UEs, respective cryptographic attestations of at least one of the following used for the respective TEEs: software and computing platform;
establishing (1444) respective secure connections with respective TEEs based on verifying that the respective cryptographic attestations are valid,
wherein the ML model is distributed to the respective TEEs via the respective secure connections.

14. The method of claim 13, wherein establishing (1440) TEEs in the respective UEs further comprises:
sending (1441) respective requests to create the TEEs to the ML clients, wherein the cryptographic attestations are received in response to the respective requests; and
verifying (1443) whether the respective cryptographic attestations are valid.

15. The method of claim 13, wherein:
the cryptographic attestations are received in respective requests from the ML clients for the ML model; and
determining (1430) whether processing of a ML model in the communication network should be distributed comprises verifying (1432) whether the respective cryptographic attestations are valid.

16. The method of claim 2, further comprising subsequently distributing (1490) one or more of the following to the respective TEEs:
an updated ML model for processing in the respective TEEs;
an indication that the ML model should be deleted or removed from the respective TEEs; or
an indication that the respective TEEs should be deactivated.

17. The method of claim 16, further comprising:
obtaining (1480), from the respective UEs, the ML model trained in the respective TEEs;
combining (!485) the trained ML models into the updated ML model distributed to the respective TEEs.

18. The method of claim 2, wherein for each of the UEs, the processing in the TEE includes one or more of the following processing operations:
training the ML model;
updating the ML model;
performing inference based on the ML model;
monitoring inference performance of the ML model; and
determining whether the ML models is outdated or invalid.

19. The method of claim 18, wherein:

determining (1430) whether processing of a ML model in the communication network should be distributed comprises determining (1432), for the respective UEs, which of the processing operations should be distributed based on the respective characteristics of the respective UEs; and the trained ML model is distributed to the respective UEs with respective indications of which processing operations should be performed by the respective UEs.

20. The method of claim 19, further comprising performing (1470) the processing operations, for the ML model, that are not identified by the respective indications distributed to the respective UEs.

21. A non-transitory, computer-readable medium (1620) storing computer-executable instructions that, when executed by processing circuitry (1610) of a user equipment, UE (920, 1120, 1220, 1600) configured for managed machine learning, ML, in a communication network, configure the UE to perform operations corresponding to the method of claim 1.

22. A user equipment, UE (920, 1120, 1220, 1600) configured for managed machine learning, ML, in a communication network, the UE comprising:
radio transceiver circuitry (1640) configured to communicate with the communication network via a radio access network, RAN; and
processing circuitry (1610) operably coupled to the radio transceiver circuitry, whereby the processing circuitry and the radio transceiver circuitry are configured to perform operations corresponding to the method of claim 1.

23. The method of claim 1, wherein the reported UE characteristics include any of the following:
UE manufacturer;
network subscription;
an identifier that is unique to the UE;
class, category, and/or type associated with the UE;
status of the UE's battery;
vendor and/or model of processing units in a UE computing platform;
processing capacity available in the UE computing platform;
configuration of available processing capacity;
memory available in the UE computing platform; and
one or more first indicia of trust for the UE computing platform.

24. The method of claim 23, wherein the first indicia of trust include any of the following:
roots of trust from a manufacturer of a processing unit used in the UE computing platform;
one or more types of trusted computing technology used in the UE computing platform; and
features that are enabled or disabled in the UE computing platform.

25. The method of claim 24, wherein the one or more types of trusted computing technology include any of the following:
Intel Software Guard eXtensions, SGX;
AMD Secure Encrypted Virtualization, SEV; and
ARM TrustZone.

26. The method of claim 23, wherein the configuration of available processing capacity includes indications of one or more of the following:
available baseband processing capacity; and
available application processing capacity.

27. The method of claim 1, further comprising:

receiving (1510), from the communication network, a first request for UE characteristics,
wherein the report is sent in response to the first request.

28. The method of claim 1, wherein:
the TEE is established when one or more ML model characteristics are greater than respective predetermined thresholds; and
when the one or more ML model characteristics are not greater than the respective predetermined thresholds:
the ML model is received from the communication network with a request for non-trusted execution; and
the method further comprises performing (1560) the one or more processing operations associated with the received ML model without establishing (1530) the TEE.

29. The method of claim 28, wherein the one or more ML model characteristics include any of the following:
an accuracy requirement; and
a duration of validity.

30. The method of claim 1, further comprising sending (1570) one or more outputs of the ML model to the communication network, wherein the one or more outputs are related to UE operations in a radio access network, RAN, associated with the communication network.

31. The method of claim 1, wherein establishing (1530) the TEE comprises the following operations by an ML client in the UE:
sending (1532), to the communication network, a cryptographic attestation of at least one of the following used by the UE: software and computing platform; and
establishing (1533) a secure connection between the TEE and the communication network,
wherein the ML model is received via the secure connection.

32. The method of claim 31, wherein the cryptographic attestation is sent in a request for the ML model.

33. The method of claim 31, wherein establishing (1530) the TEE further comprises receiving (1531), by the ML client from the communication network, a request to create the TEE, wherein the cryptographic attestation is sent in response to the request.

34. The method of claim 1, wherein performing (1550) the processing operations associated with the received ML model includes one or more of the following:
training (1551) the received ML model;
updating (1552) the received ML model;
performing (1553) inference based on the received ML model;
monitoring (1554) inference performance of the received ML model; and
determining (1555) whether the received ML model is outdated or invalid.

35. The method of claim 34, further comprising subsequently receiving (1585) one or more of the following from the communication network:
an updated ML model for processing in the TEE;
an indication that the received ML model should be deleted or removed from the TEE; or
an indication that the TEE should be deactivated.

36. The method of claim 35, further comprising:
after training (1551) the received ML model, sending (1580) the trained ML model to the communication network, wherein the updated ML model is received in response; and
performing (1590) the processing operations on the updated ML model in the TEE.

37. The method of claim 34, wherein the ML model is received with an indication of which processing operations should be performed by the UE.

38. One or more network functions, NFs (910, 1110, 1211-1213, 1311-1313, 1910, 1920), of a communication network, that are arranged to perform managed machine learning, ML, in the communication network based on:
- communication interface circuitry (1840, 1970) configured to communicate with one or more user equipment, UE (920, 1120, 1220, 1600) via a radio access network, RAN; and
- processing circuitry (1810, 1960) operably coupled to the communication interface circuitry, whereby the processing circuitry and the communication interface circuitry are configured to perform operations corresponding to the method of claim 2.

39. A non-transitory, computer-readable medium (1820, 1990) storing computer-executable instructions that, when executed by processing circuitry (1810, 1960) of a communication network, configured one or more network functions, NFs (910, 1110, 1211-1213, 1311-1313, 1910, 1920) of the communication network to perform operations corresponding to the method of claim 2.

\* \* \* \* \*